(12) United States Patent
Cage et al.

(10) Patent No.: US 11,057,369 B2
(45) Date of Patent: *Jul. 6, 2021

(54) RECONCILIATION DIGITAL FACILITATORS IN A HYBRID DISTRIBUTED NETWORK ECOSYSTEM

(71) Applicant: Mox-SpeedChain, LLC, Atlanta, GA (US)

(72) Inventors: Daniel Cage, Atlanta, GA (US); Padmakar Kankipati, Marietta, GA (US); Norman R. Silverman, Dallas, TX (US)

(73) Assignee: Mox-SpeedChain, LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/414,530

(22) Filed: May 16, 2019

(65) Prior Publication Data

US 2020/0213292 A1 Jul. 2, 2020

Related U.S. Application Data

(60) Provisional application No. 62/786,202, filed on Dec. 28, 2018.

(51) Int. Cl.
*H04L 29/06* (2006.01)
*G06Q 20/38* (2012.01)
(Continued)

(52) U.S. Cl.
CPC ............ *H04L 63/083* (2013.01); *G06F 16/13* (2019.01); *G06F 16/182* (2019.01); *G06N 20/00* (2019.01);
(Continued)

(58) Field of Classification Search
CPC ....... H04L 63/083; H04L 9/14; H04L 9/0637; H04L 9/0894; G06Q 20/3821;
(Continued)

(56) References Cited

U.S. PATENT DOCUMENTS 7,340,421 B1 * 3/2008 Marcial .................. G06Q 40/02
705/30
7,860,221 B2 * 12/2010 Adkinson ............ H04Q 3/0029
379/9.02

(Continued)

FOREIGN PATENT DOCUMENTS

WO 2018085558 A2 5/2018

OTHER PUBLICATIONS

Christidis et al., Blockchains and Smart Contracts for the Internet of Things, IEEE, May 2016.*

(Continued)

*Primary Examiner* — David Garcia Cervetti
(74) *Attorney, Agent, or Firm* — Baker & McKenzie LLP

(57) ABSTRACT

A method for use in a hybrid network ecosystem comprising an enterprise network and a reconciliation network, the method comprising generating, by at least one first computing node in the enterprise network or the reconciliation network, a first digital facilitator, wherein the first digital facilitator enables a first device to use a private key to access data associated with a distributed ledger operation. The method also comprises transmitting, via the reconciliation network, the data from the first computing device to a second computing device, wherein the first computing device and the second computing device are connected via the reconciliation network.

18 Claims, 9 Drawing Sheets

(51) Int. Cl.
    *G06N 20/00*     (2019.01)
    *H04L 9/14*     (2006.01)
    *G06F 16/182*     (2019.01)
    *G06F 16/13*     (2019.01)
    *G06Q 10/06*     (2012.01)
    *G06Q 20/36*     (2012.01)
    *H04L 9/06*     (2006.01)
    *H04L 9/08*     (2006.01)

(52) U.S. Cl.
    CPC ....... *G06Q 10/067* (2013.01); *G06Q 20/3678* (2013.01); *G06Q 20/3821* (2013.01); *H04L 9/0637* (2013.01); *H04L 9/0894* (2013.01); *H04L 9/14* (2013.01)

(58) Field of Classification Search
    CPC .. G06Q 10/067; G06Q 20/3678; G06N 20/00; G06F 16/182; G06F 16/13; G06F 16/9024
    See application file for complete search history.

(56) References Cited

U.S. PATENT DOCUMENTS

| | | | |
|---|---|---|---|
| 7,886,335 B1* | 2/2011 | Chickering | H04L 63/0263 726/1 |
| 10,095,888 B1 | 10/2018 | Lee et al. | |
| 10,102,526 B1* | 10/2018 | Madisetti | G06Q 20/389 |
| 10,135,607 B1* | 11/2018 | Roets | H04L 9/3213 |
| 10,248,783 B2* | 4/2019 | Costa Faidella | G06F 21/645 |
| 10,361,853 B2* | 7/2019 | Castagna | H04L 9/3247 |
| 10,373,158 B1 | 8/2019 | James et al. | |
| 10,380,685 B1 | 8/2019 | Phillips et al. | |
| 10,402,792 B2* | 9/2019 | Lin | H04L 63/061 |
| 10,402,793 B2* | 9/2019 | Haldenby | G06Q 50/18 |
| 2013/0191278 A1* | 7/2013 | O'Leary | G06Q 20/10 705/39 |
| 2013/0325680 A1 | 12/2013 | Satyavolu et al. | |
| 2014/0066194 A1 | 3/2014 | Cage et al. | |
| 2014/0372756 A1 | 12/2014 | O'Hare et al. | |
| 2015/0227890 A1 | 8/2015 | Bednarek et al. | |
| 2017/0046526 A1* | 2/2017 | Chan | G06Q 10/063114 |
| 2017/0046651 A1* | 2/2017 | Lin | H04L 9/0861 |
| 2017/0046693 A1* | 2/2017 | Haldenby | H04L 63/062 |
| 2017/0076293 A1 | 3/2017 | Cage et al. | |
| 2017/0230353 A1* | 8/2017 | Kurian | G06Q 20/4014 |
| 2017/0230375 A1* | 8/2017 | Kurian | H04L 63/102 |
| 2017/0236094 A1* | 8/2017 | Shah | G06Q 10/101 705/300 |
| 2017/0243193 A1* | 8/2017 | Manian | G06Q 20/065 |
| 2017/0244721 A1* | 8/2017 | Kurian | H04L 63/105 |
| 2017/0270491 A1 | 9/2017 | Cage et al. | |
| 2017/0337534 A1* | 11/2017 | Goeringer | G06Q 20/06 |
| 2018/0078843 A1* | 3/2018 | Tran | A61B 5/0024 |
| 2018/0114205 A1* | 4/2018 | Thomas | G06Q 40/02 |
| 2018/0117446 A1* | 5/2018 | Tran | A42B 3/0433 |
| 2018/0123779 A1* | 5/2018 | Zhang | H04L 9/0637 |
| 2018/0130050 A1* | 5/2018 | Taylor | H04L 9/3247 |
| 2018/0130158 A1* | 5/2018 | Atkinson | G06F 21/00 |
| 2018/0144156 A1* | 5/2018 | Marin | G06F 21/6272 |
| 2018/0173203 A1* | 6/2018 | Freer | G06F 3/1238 |
| 2018/0204213 A1* | 7/2018 | Zappier | H04L 63/10 |
| 2018/0205555 A1* | 7/2018 | Watanabe | H04L 9/3247 |
| 2018/0211252 A1* | 7/2018 | Lintner | G06Q 20/3825 |
| 2018/0268401 A1* | 9/2018 | Ortiz | G06Q 20/204 |
| 2018/0276625 A1* | 9/2018 | Saye | G06Q 20/363 |
| 2018/0285996 A1* | 10/2018 | Ma | G06F 16/2428 |
| 2018/0314809 A1* | 11/2018 | Mintz | H04L 9/3236 |
| 2018/0330385 A1* | 11/2018 | Johnson | G06Q 10/1053 |
| 2019/0026716 A1 | 1/2019 | Anbukkarasu et al. | |
| 2019/0036692 A1* | 1/2019 | Sundaresan | H04L 9/0643 |
| 2019/0043043 A1 | 2/2019 | Saraniecki et al. | |
| 2019/0044714 A1 | 2/2019 | Parker et al. | |
| 2019/0051390 A1 | 2/2019 | Shah | |
| 2019/0058595 A1* | 2/2019 | Hamasni | G06Q 20/401 |
| 2019/0073666 A1* | 3/2019 | Ortiz | H04L 9/3236 |
| 2019/0080308 A1 | 3/2019 | Sheikh et al. | |
| 2019/0080407 A1* | 3/2019 | Molinari | G06Q 20/223 |
| 2019/0081789 A1* | 3/2019 | Madisetti | G06Q 20/401 |
| 2019/0089701 A1* | 3/2019 | Mercury | G06F 16/285 |
| 2019/0164136 A1 | 5/2019 | Gray | |
| 2019/0180275 A1* | 6/2019 | Safak | G06Q 20/3827 |
| 2019/0213831 A1 | 7/2019 | Cage et al. | |
| 2019/0220831 A1* | 7/2019 | Rangarajan | H04L 9/3066 |
| 2019/0229892 A1* | 7/2019 | Jevans | H04L 9/3271 |
| 2019/0236598 A1* | 8/2019 | Padmanabhan | G06Q 20/4016 |
| 2019/0238525 A1* | 8/2019 | Padmanabhan | G06F 21/6245 |
| 2019/0253258 A1* | 8/2019 | Thekadath | G06F 21/602 |
| 2019/0259007 A1* | 8/2019 | LaMontagne | G06Q 20/3829 |
| 2019/0294817 A1* | 9/2019 | Hennebert | G06F 21/6245 |
| 2019/0303886 A1* | 10/2019 | Kikinis | H04L 9/0637 |
| 2019/0340607 A1* | 11/2019 | Lynn | G06Q 20/3829 |
| 2019/0340609 A1* | 11/2019 | Mayadas | H04L 9/3239 |
| 2019/0356638 A1* | 11/2019 | Filter | G06Q 20/3829 |
| 2019/0370811 A1* | 12/2019 | Zhang | G06Q 20/065 |
| 2020/0013027 A1* | 1/2020 | Zhu | G06Q 20/0658 |
| 2020/0027080 A1* | 1/2020 | Holland | H04L 9/3255 |
| 2020/0034876 A1* | 1/2020 | Soundararajan | H04L 9/3247 |
| 2020/0042989 A1 | 2/2020 | Ramadoss et al. | |
| 2020/0043115 A1* | 2/2020 | Nelson | H04L 9/3239 |
| 2020/0067697 A1* | 2/2020 | Puddu | G06F 21/602 |
| 2020/0092084 A1* | 3/2020 | Maroney | H04L 9/0637 |
| 2020/0104836 A1* | 4/2020 | Coburn | G06F 16/2255 |
| 2020/0118068 A1* | 4/2020 | Turetsky | G06Q 20/06 |
| 2020/0127812 A1* | 4/2020 | Schuler | H04L 63/0428 |
| 2020/0133955 A1* | 4/2020 | Padmanabhan | G06F 16/2379 |
| 2020/0134719 A1* | 4/2020 | Malik | G06Q 20/3674 |
| 2020/0134986 A1* | 4/2020 | Morgan | G07F 19/206 |
| 2020/0136923 A1 | 4/2020 | Altshuler et al. | |

OTHER PUBLICATIONS

Ogiela et al., Security of Distributed Ledger Solutions Based on Blockchain Technologies, IEEE, 2018.*
Gabor Magyar, Blockchain: solving the privacy and research availability tradeoff for EHR data, Nov. 2017, IEEE.*
Office Action dated Jan. 8, 2020 in connection with U.S. Appl. No. 16/414,536, 9 pages.
Office Action dated Sep. 30, 2019 in connection with U.S. Appl. No. 16/414,516, 8 pages.
Cage et al., U.S. Appl. No. 16/414,516.
Cage et al., U.S. Appl. No. 16/414,536.
Cage et al., U.S. Appl. No. 16/414,524.
Office Action dated Mar. 4, 2020 in connection with U.S. Appl. No. 16/414,516, 14 pages.
Office Action dated Jun. 5, 2020 in connection with U.S. Appl. No. 16/414,536, 23 pages.
Office Action dated Oct. 2, 2019 in connection with U.S. Appl. No. 16/414,524, 14 pages.
International Search Report and Written Opinion dated Apr. 29, 2020 in connection with International Application No. PCT/US2019/068705, 11 pages.
Christidis et al. Blockchains and Smart Contracts for the Internet of Things. IEEE May 2016. (Year: 2016).
GCC Examination Report dated Oct. 27, 2020 in connection with GCC Application No. Gc 2019-38929, 3 pages.
Office Action dated Sep. 24, 2020 in connection with U.S. Appl. No. 16/414,516, 16 pages.
Notice of Allowance dated Feb. 15, 2021 in connection with U.S. Appl. No. 16/414,524, 14 pages.

* cited by examiner

RECONCILIATION DIGITAL FACILITATORS IN A HYBRID DISTRIBUTED NETWORK ECOSYSTEM

CROSS-REFERENCE TO RELATED APPLICATION

This application claims the benefit of U.S. Provisional Patent Application No. 62/786,202, filed Dec. 28, 2018, which is incorporated by reference herein in its entirety for all purposes.

TECHNICAL FIELD

This disclosure generally relates to distributed ledgers or blockchain-based systems.

BACKGROUND

There is a need for a blockchain-based ecosystem developed for transparency, not anonymity, which is the hallmark of most blockchain solutions.

SUMMARY

In some embodiments, a method is provided for use in a hybrid network ecosystem comprising an enterprise network and a reconciliation network, the method comprising: generating, by at least one first computing node in the enterprise network or the reconciliation network, a first digital facilitator, wherein the first digital facilitator provides one or more parameters for accessing or distributing data on a distributed ledger in the enterprise network, wherein a private key is used for performing a computing operation, based on the data, in the enterprise network; and generating, by the at least one first computing node in the enterprise network or the reconciliation network or at least one second computing node in the enterprise network or the reconciliation network, a second digital facilitator, wherein the second digital facilitator provides the one or more parameters for accessing or distributing the data in the reconciliation network.

In some embodiments, the computing operation comprises a distributed ledger-based computing operation.

In some embodiments, the first digital facilitator comprises an issuance digital facilitator.

In some embodiments, the second digital facilitator comprises a reconciliation digital facilitator.

In some embodiments, the one or more parameters comprises time-based parameters, geographical or network location-based parameters, identity-based parameters, or amount-based parameters.

In some embodiments, the method further comprises preventing unauthorized access to the data in the enterprise network or the reconciliation network.

The method of claim 6, wherein the unauthorized access is determined based on a private key provided for gaining access to the data.

In some embodiments, the computing operation comprises a digital token-based computing operation.

In some embodiments, the first digital facilitator or the second digital facilitator is used to generate a digital token, wherein the digital token enables the computing operation.

In some embodiments, the computing operation comprises an asset-transferring computing operation.

In some embodiments, the at least one first computing node or the at least one second computing node comprises an artificially intelligent computing node.

In some embodiments, the at least one first computing node or the at least one second computing node executes a machine learning operation.

In some embodiments, the distributed ledger is associated with a blockchain system.

In some embodiments, a method is provided for use in a hybrid network ecosystem comprising an enterprise network and a reconciliation network, the method comprising: generating, by at least one first computing node in the enterprise network or the reconciliation network, a first digital facilitator, wherein the first digital facilitator enables a first device to use a private key to access data associated with a distributed ledger transaction; and transmitting, via the reconciliation network, the data from the first computing device to a second computing device, wherein the first computing device and the second computing device are connected via the reconciliation network.

In some embodiments, the second device is or is not part of the enterprise network.

In some embodiments, the data associated with the distributed ledger transaction is transparent to the second computing device.

In some embodiments, the method further comprises generating, by the at least one first computing node in the enterprise network or the reconciliation network or at least one second computing node in the enterprise network or the reconciliation network, an issuance digital facilitator, wherein reconciliation information associated with the issuance digital facilitator is extracted or received by the first computing device, wherein the reconciliation information associated with the issuance digital facilitator sets parameters for the distributed ledger transaction.

In some embodiments, a method is provided for use in a hybrid network ecosystem comprising an enterprise network and a reconciliation network, the method comprising: generating a private key for a user or device in the enterprise network or the reconciliation network; associating identification information associated with the private key or associated with a custodian of the private key, wherein the identification information enables initiation or execution of one or more distributed ledger-based computing transactions in the enterprise network or the reconciliation network; and generating, by the at least one first computing node in the enterprise network or the reconciliation network or at least one second computing node in the enterprise network or the reconciliation network, an issuance digital facilitator, wherein parametric information associated with the issuance digital facilitator is applied to the one or more distributed ledger-based computing transactions in the enterprise network or the reconciliation network.

In some embodiments, the identification information enables tracking of information associated with the one or more distributed ledger-based computing transactions in the enterprise network or the reconciliation network.

In some embodiments, a method associated with an asset-backed network token for use in a distributed ledger associated with a hybrid network ecosystem comprising an enterprise network and a reconciliation network comprises: generating, by at least one computing node in the reconciliation network, a network token, the network token associated with a physical asset, the physical asset being stored in a physical entity, the network token being transferable in the enterprise network; generating, by the at least one computing node in the reconciliation network, a digital contract associated with the network token or the generation of the network token, the digital contract enabling a transaction between a first computing node in the enterprise network and a second computing node in the enterprise network, the transaction comprising a transfer of the network token between the first computing node and the second computing node; and reconciling, by the at least one computing node in the reconciliation network, and in the distributed ledger, the transfer of the network token between the first computing node in the enterprise network and the second computing node in the enterprise network. In some embodiments, any transaction or computing operation or network token does not need to be backed by an asset. Therefore, any transaction or computing operation or network token described as being asset-backed may not be asset-backed in some embodiments.

In some embodiments, the method further comprises providing a digital wallet to a computing device associated with the first computing node or the second computing node, the digital wallet enabling initiation of the transaction between the first computing node and the second computing node. As used herein, a wallet may refer to any type of digital storage or repository.

In some embodiments, the digital wallet enables generation of a code for use in initiating the transaction between the first computing node and the second computing node.

In some embodiments, the code comprises a QR code. Alternatively, the code may be any other type of code.

In some embodiments, the transaction between the first computing node and the second computing node comprises a wireless transaction.

In some embodiments, the digital wallet provides a dashboard for enabling viewing information associated with the reconciling.

In some embodiments, the digital wallet comprises a mobile wallet.

In some embodiments, the digital contract comprises a smart contract.

In some embodiments, the method further comprises generating at least one instance of the reconciliation.

In some embodiments, the method further comprises storing the at least one instance of the reconciliation in a local database associated with the enterprise network.

In some embodiments, the method further comprises storing the at least one instance of the reconciliation in a local database associated with the reconciliation network.

In some embodiments, the method further comprises transmitting the at least one instance of the reconciliation to one or more nodes located inside or outside of at least one of the enterprise network or the reconciliation network.

In some embodiments, the reconciliation network comprises a token-issuing or token-generating network.

In some embodiments, the at least one computing node in the reconciliation network comprises an intelligent computing node.

In some embodiments, at least one of the first computing node or the second computing node comprises at least one of a mobile computing device or a non-mobile computing device.

In some embodiments, a key associated with at least one of the network token, the generation of the network token, the generation of the digital contract, the transfer of the network token, or the reconciliation of the network token is at least one of recoverable, traceable, storable, or transmittable to at least one entity.

In some embodiments, the key comprises a public key.

In some embodiments, the key comprises a private key.

In some embodiments, information associated with at least one of the network token, the generation of the network token, the generation of the digital contract, the transfer of the network token, or the reconciliation of the network token is at least one of recoverable, traceable, storable, or transmittable to at least one entity.

In some embodiments, another method associated with an asset-backed network token for use in a distributed ledger associated with a hybrid network ecosystem comprising an enterprise network and a reconciliation network comprises: generating, by at least one computing node in the reconciliation network, a network token, the network token associated with a digital asset, the network token being transferable in the enterprise network; generating, by the at least one computing node in the reconciliation network, a digital facilitator associated with the network token or the generation of the network token, the digital facilitator enabling or governing a transaction between a first computing node in the enterprise network and a second computing node in the enterprise network, the transaction comprising a transfer of the network token between the first computing node and the second computing node; and processing, by the at least one computing node in the reconciliation network, and in the distributed ledger, the transfer of the network token between the first computing node in the enterprise network and the second computing node in the enterprise network.

In some embodiments, the digital facilitator comprises a smart contract.

In some embodiments, the digital facilitator comprises computing protocol.

In some embodiments, the digital facilitator comprises computing protocol customized for at least one of the enterprise network or the reconciliation network.

In some embodiments, the digital facilitator comprises digital verification information.

In some embodiments, another method associated with an asset-backed network token for use in a distributed ledger associated with a hybrid network ecosystem comprising an enterprise network and a reconciliation network comprises: generating, by at least one computing node in the reconciliation network, a network token, the network token associated with a physical asset, the physical asset being stored in a physical entity, the network token being transferable in the enterprise network; generating, by the at least one computing node in the reconciliation network, a digital facilitator (or enabler) associated with the network token or the generation of the network token, the digital facilitator enabling a transaction between a first computing node in the enterprise network and a second computing node in the enterprise network, the transaction comprising a transfer of the network token between the first computing node and the second computing node, the transfer of the network token between the first computing node and the second computing node not causing transfer of the physical asset; and processing or reconciling, by the at least one computing node in the reconciliation network, and in the distributed ledger, the transfer of the network token between the first computing node in the enterprise network and the second computing node in the enterprise network.

In some embodiments, another method associated with an asset-backed network token for use in a distributed ledger associated with a hybrid network ecosystem comprising an enterprise network and a reconciliation network comprises: generating, by at least one computing node in the reconciliation network or the enterprise network, a network token, the network token associated with a physical asset, the physical asset being stored in a physical entity, the network token being transferable in at least one of the enterprise network or the reconciliation network; generating, by the at least one computing node in the reconciliation network or the enterprise network, a digital facilitator associated with the network token or the generation of the network token, the digital facilitator enabling a transaction between a first computing node in the enterprise network and a second computing node in at least one of the enterprise network or the reconciliation network, the transaction comprising a transfer of the network token between the first computing node and the second computing node, the transfer of the network token between the first computing node and the second computing node not causing transfer of the physical asset; and processing or reconciling, by the at least one computing node in the reconciliation network or the enterprise network, and across the distributed ledger, the transfer of the network token between the first computing node in the enterprise network and the second computing node in the enterprise network.

In some embodiments, the method further comprises compiling data associated with the distributed ledger.

In some embodiments, the method further comprises compiling data associated with the processing or reconciling step into a smart contract, wherein the smart contract is stored across the distributed ledger.

In some embodiments, the method further comprises coding data associated with the processing or reconciling step into a smart contract, wherein the smart contract is stored across the distributed ledger.

In some embodiments, the method further comprises using an artificial intelligence (AI) engine to process the coded data. In some embodiments, AI can be used to process any data or transactions described herein.

In some embodiments, the method further comprises coding data associated with the processing or reconciling step into a digital facilitator, wherein the smart contract is stored across the digital facilitator.

In some embodiments, a method is provided associated with an asset-backed network token for use in a distributed ledger associated with a hybrid network ecosystem comprising an enterprise network and a reconciliation network, the method comprising: generating, by at least one computing node in the reconciliation network or the enterprise network, a network token, the network token being transferable in at least one of the enterprise network or the reconciliation network; determining a user in a geographical location is an approved user for executing computing transactions in the at least one of the enterprise network or the reconciliation network, the approved user being associated with a digital repository comprising or being associated with the network token; transmitting approval to a computing system in the geographical location, the computing system interacting with the digital repository, the computing system enabling the user to recover a physical asset in exchange for a computing transaction based on the network token, the physical asset being specific to the geographical location; and processing or reconciling, by the at least one computing node in the reconciliation network or the enterprise network, and across the distributed ledger, the approval enabling the user to recover the physical asset in exchange for the computing transaction based on the network token.

In some embodiments, the method further comprises generating, by the at least one computing node in the reconciliation network or the enterprise network, a digital facilitator associated with at least one of the network token, the generation of the network token, or an exchange computing transaction based on the network token, the digital facilitator enabling the user to recover the physical asset in exchange for the computing transaction based on the network token.

In some embodiments, the physical asset is based on a real-time comparison of the network token with a reference physical asset or a reference digital asset.

In some embodiments, the physical asset is based on a real-time comparison of the physical asset with a reference physical asset or a reference digital asset.

BRIEF DESCRIPTION OF THE DRAWINGS

The disclosure is illustrated by way of example, and not by way of limitation in the figures of the accompanying drawings in which like reference numerals are used to refer to similar elements. It is emphasized that various features may not be drawn to scale and the dimensions of various features may be arbitrarily increased or reduced for clarity of discussion. Further, some components may be omitted in certain figures for clarity of discussion.

DETAILED DESCRIPTION

Figure 1:
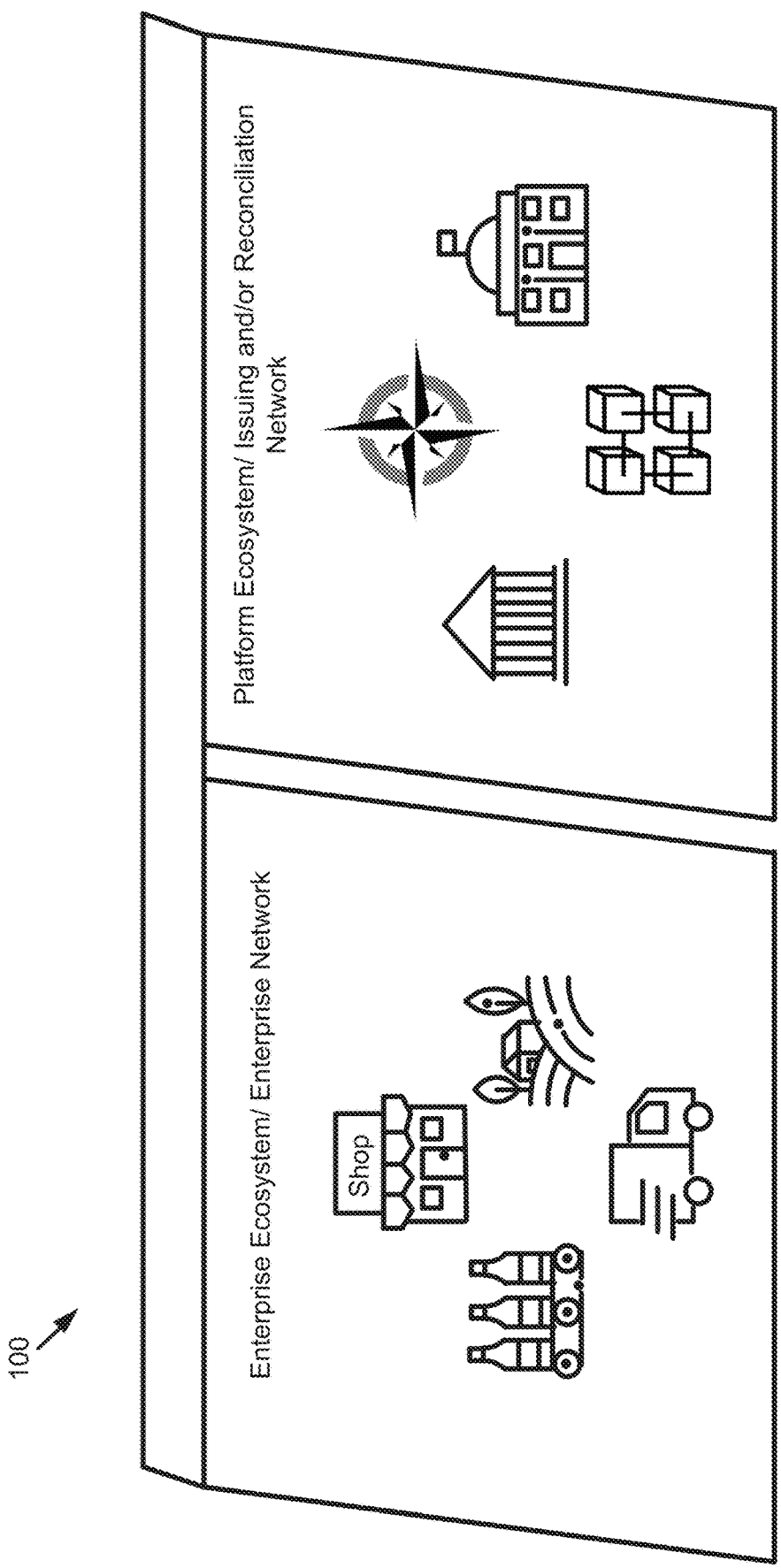
FIG. 1 is a schematic diagram illustrating a hybrid system, according to some embodiments of this disclosure.

FIG. 1 is a schematic diagram illustrating a hybrid system 100, according to some embodiments of this disclosure. The hybrid system may comprise an enterprise ecosystem or enterprise network. The hybrid system may further comprise a platform ecosystem or an issuing and/or reconciliation network ("reconciliation network"). Alternatively or additionally, the hybrid system may further comprise a node, an endpoint, a user, an endpoint computing device, a local or remote user terminal, a mobile computing device such as a mobile phone or tablet, a wearable device, etc. The enterprise network and/or the reconciliation network may be associated with, communicate with, and/or comprise one or more distributed ledgers (e.g., decentralized distributed ledgers) and/or blockchain systems. The enterprise network may include one or more computing nodes associated with token transaction initiators or receivers associated with an entity or a product, which can be a digital or physical product associated with the entity. The reconciliation network may include one or more nodes for issuing or generating asset-backed network tokens, issuing or generating smart contracts based on the same, and/or reconciling asset-backed network token transactions conducted in and/or outside the enterprise network. In some embodiments, one of the nodes in the reconciliation network may be associated with or comprise an exchange or an exchange computer server. The exchange computer server (or a group of servers including those that reside outside the platform ecosystem and/or enterprise system) may create or issue digital assets or tokens; reconcile, on a periodic basis, transactions involving the digital assets or tokens and/or involving smart contracts (or other digital facilitators) based on the digital assets or token; and provide access to a user interface and/or associated mobile application (e.g., mobile wallet application) that enables users associated with nodes on the enterprise ecosystem to execute transactions (e.g., computing transactions) with each other; and communicate information about the reconciliation with other entities.

In some embodiments, the hybrid system and/or the enterprise network and/or the reconciliation network may be associated with a specific location (e.g., geographical jurisdiction such as a country, city, etc.). In such embodiments, computing transactions within the location will take place using the digital asset or token such that the computing transactions occur and/or are reconciled on a distributed ledger or blockchain. In some embodiments, the digital asset or token may be replaced with a physical asset and computing transactions associated with the physical asset may still occur and/or are reconciled on the distributed ledger or blockchain. The location may alternatively or additionally be a network location.

In some embodiments, the enterprise network and the reconciliation network may be a single network. In some embodiments, computing nodes (and/or users) are pre-approved to perform certain types of computing transactions (e.g., based on the type of approval). Smart contracts (e.g., associated with or not associated with digital assets or tokens) may be created and registered/reconciled on the distributed ledger than enable the computing nodes (or users associated with the computing nodes) to perform those certain types of computing transactions on the distributed ledger.

In some embodiments, a digital asset or token to physical asset bridge is provided. In some embodiments, a user or computing node in a jurisdiction may not have or be associated with a physical asset enabling the user to conduct computing transactions in the jurisdiction (or location). However, the user may be a pre-approved user in the hybrid system and/or enterprise network and/or reconciliation network, wherein the hybrid system and/or enterprise network and/or reconciliation network is associated with the jurisdiction. The user may interact (e.g., scanning a code or otherwise conducting a wireless transaction with a mobile device, etc.) with a computing system in the jurisdiction using the user's mobile wallet such that the computing system determines that the user is associated with digital assets or tokens for use in computing transactions (e.g., specific computing transactions, and/or specific computing transactions associated with the jurisdictions and/or specific computing transactions associated with the hybrid system and/or enterprise network and/or reconciliation network, etc.), and enable conversion of a selected quantity of those digital assets or token to physical assets for use in these computing transactions in the jurisdiction. The quantity of physical assets provided to the user may be based on a substantially real-time conversion of the tokens to jurisdiction-specific physical assets (e.g., based on accessing reference information such as a value of a physical asset associated with that jurisdiction or a different jurisdiction with respect to specific physical assets or digital assets or tokens, etc.).

Figure 2:
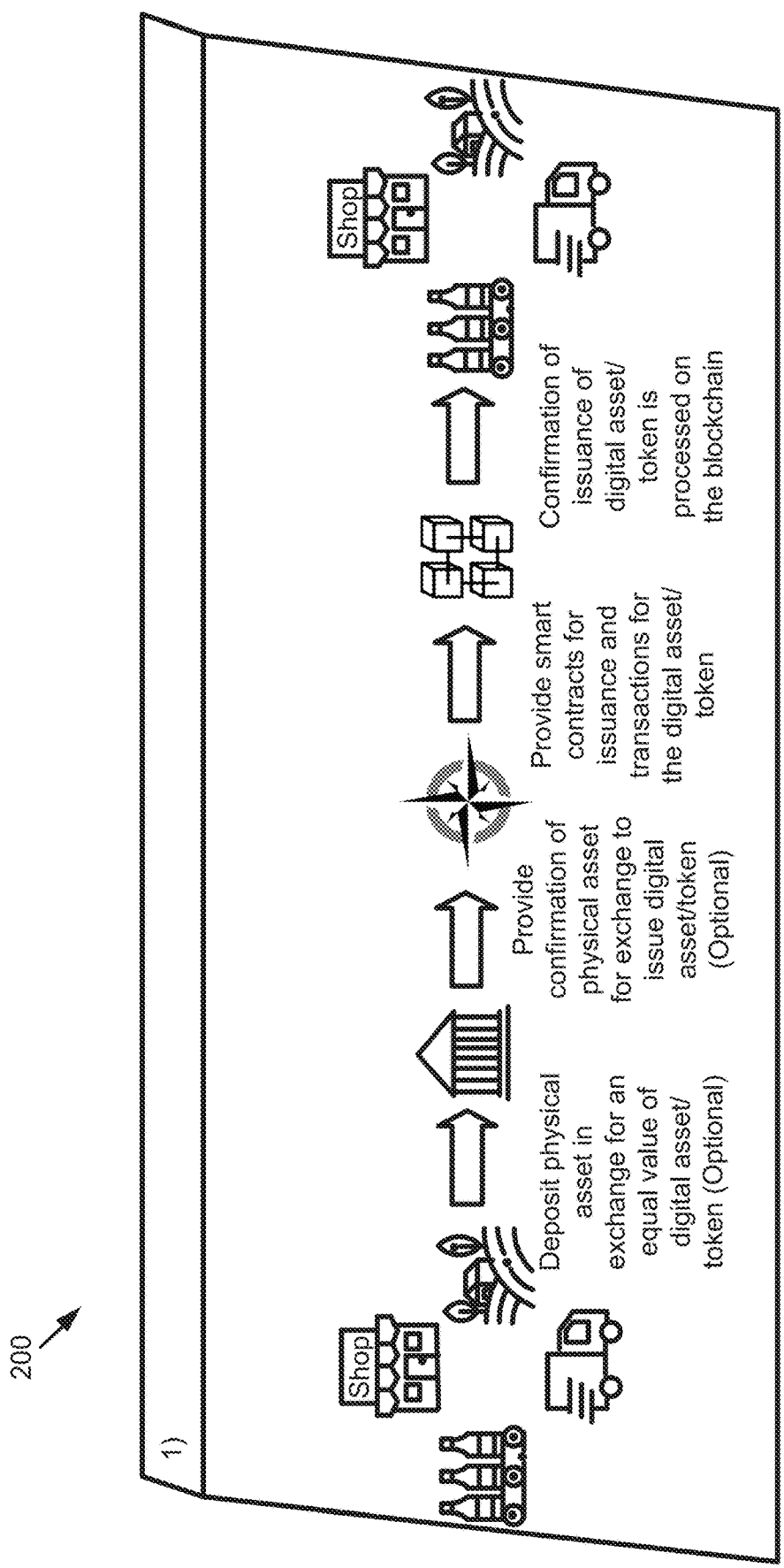
FIG. 2 is a schematic diagram associated with a network ecosystem, according to some embodiments of this disclosure.

FIG. 2 is a schematic diagram associated with a network ecosystem 200, according to some embodiments of this disclosure. The schematic diagram shows exemplary steps. In some embodiments, a physical asset is deposited in a secure storage area (e.g., in a physical entity), in exchange for a digital asset or token. A confirmation of the deposit of the physical asset is provided by the physical entity to a computer server associated with an exchange ("exchange computer server"). Subsequently, the exchange computer server ("MOX") issues a digital asset or token. The exchange computer server may generate and issue smart contracts (or other digital facilitators) for use in transactions (e.g., computing transactions or other transactions) associated involving the digital asset or token in and/or outside the enterprise network. In some embodiments, confirmation of issuance of the digital asset or token is provided on a distributed ledger system or blockchain. In some embodiments, a first digital asset or token (instead of a physical asset) is deposited in a secure storage (e.g., in a digital facility) in exchange for a second digital asset or token.

Figure 3:
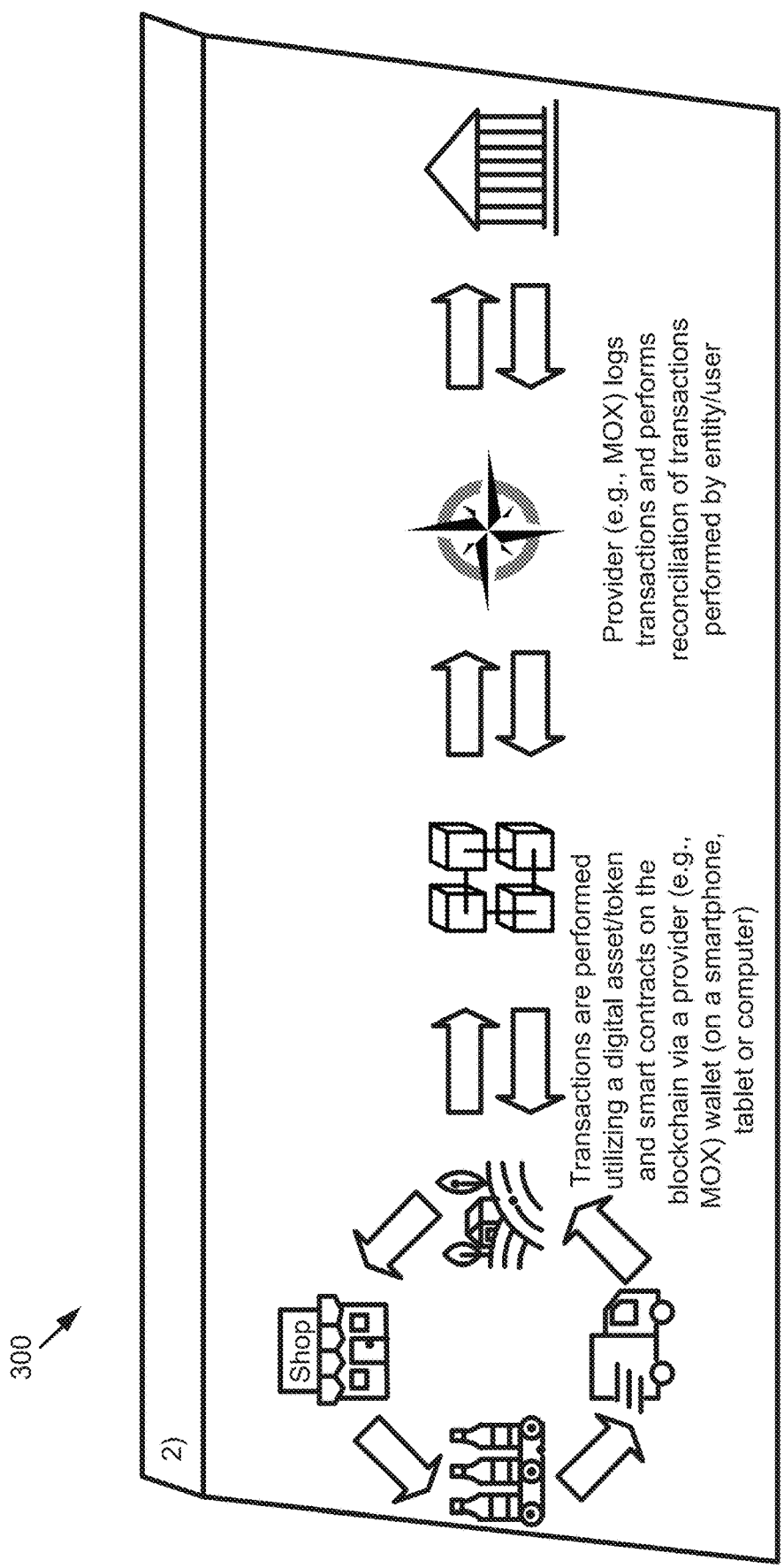
FIG. 3 is another schematic diagram associated with a network ecosystem, according to some embodiments of this disclosure.

FIG. 3 is another schematic diagram associated with a network ecosystem 300, according to some embodiments of this disclosure. FIG. 3 shows that transactions in the enterprise network are performed using the digital asset or token and smart contracts on the blockchain via a mobile wallet initialized on a mobile computing device, computing tablet, or non-mobile computing device. FIG. 3 also shows that the exchange computer server logs transactions and performs reconciliation of transactions performed by a computing node in the enterprise network.

Figure 4:
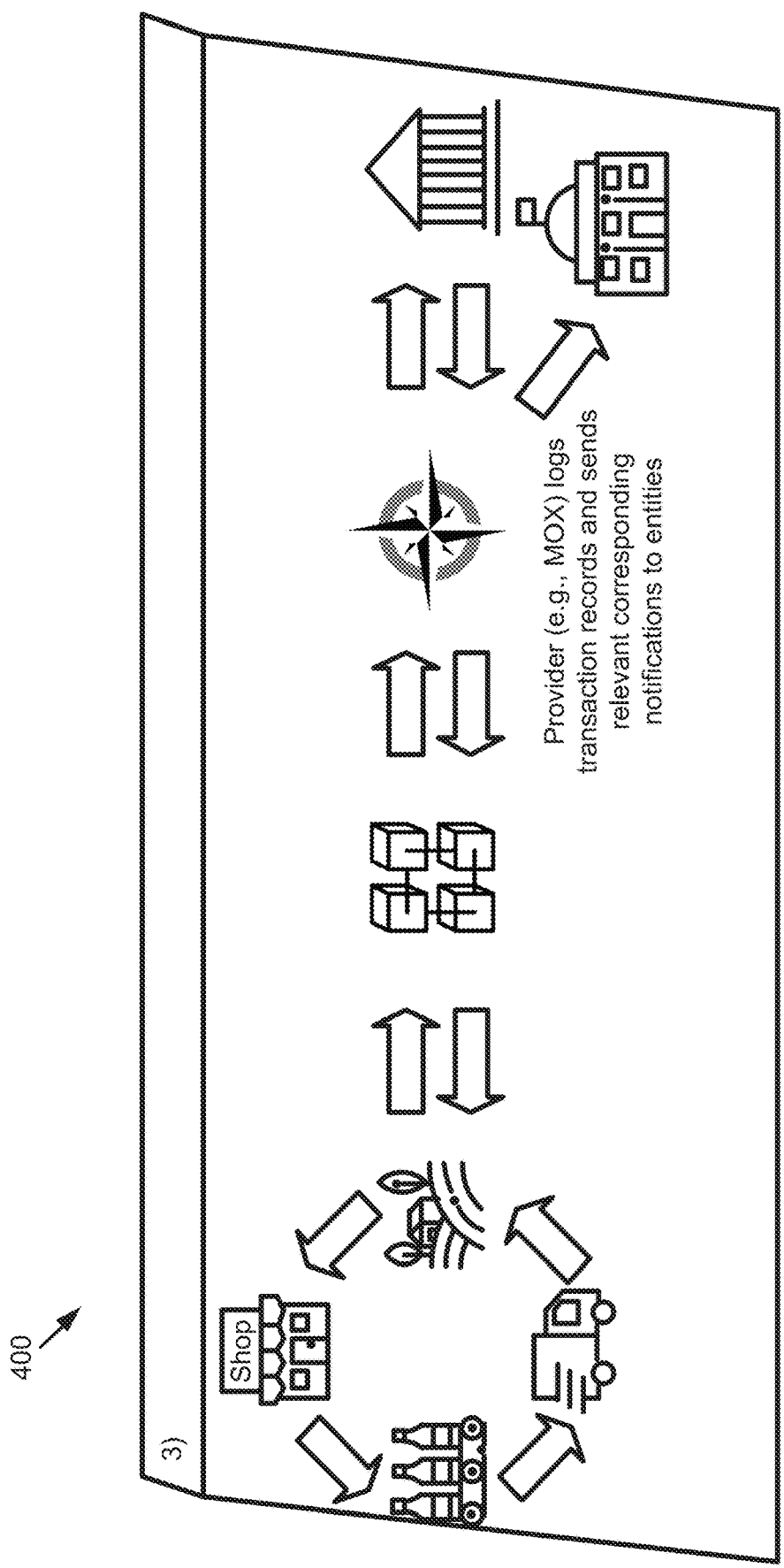
FIG. 4 is another schematic diagram associated with a network ecosystem, according to some embodiments of this disclosure.

FIG. 4 is another schematic diagram associated with a network ecosystem 400, according to some embodiments of this disclosure. FIG. 4 shows that the exchange computer server logs transactions records and transmits (or makes available) notifications associated with the transactions or reconciliation of the transactions to entities in and/or outside at least one of the enterprise network, the reconciliation network, or the hybrid network ecosystem. In some embodiments, the reconciliation network may include a remittance network. Any reconciliation process described herein may include remittance as well.

Figure 5:
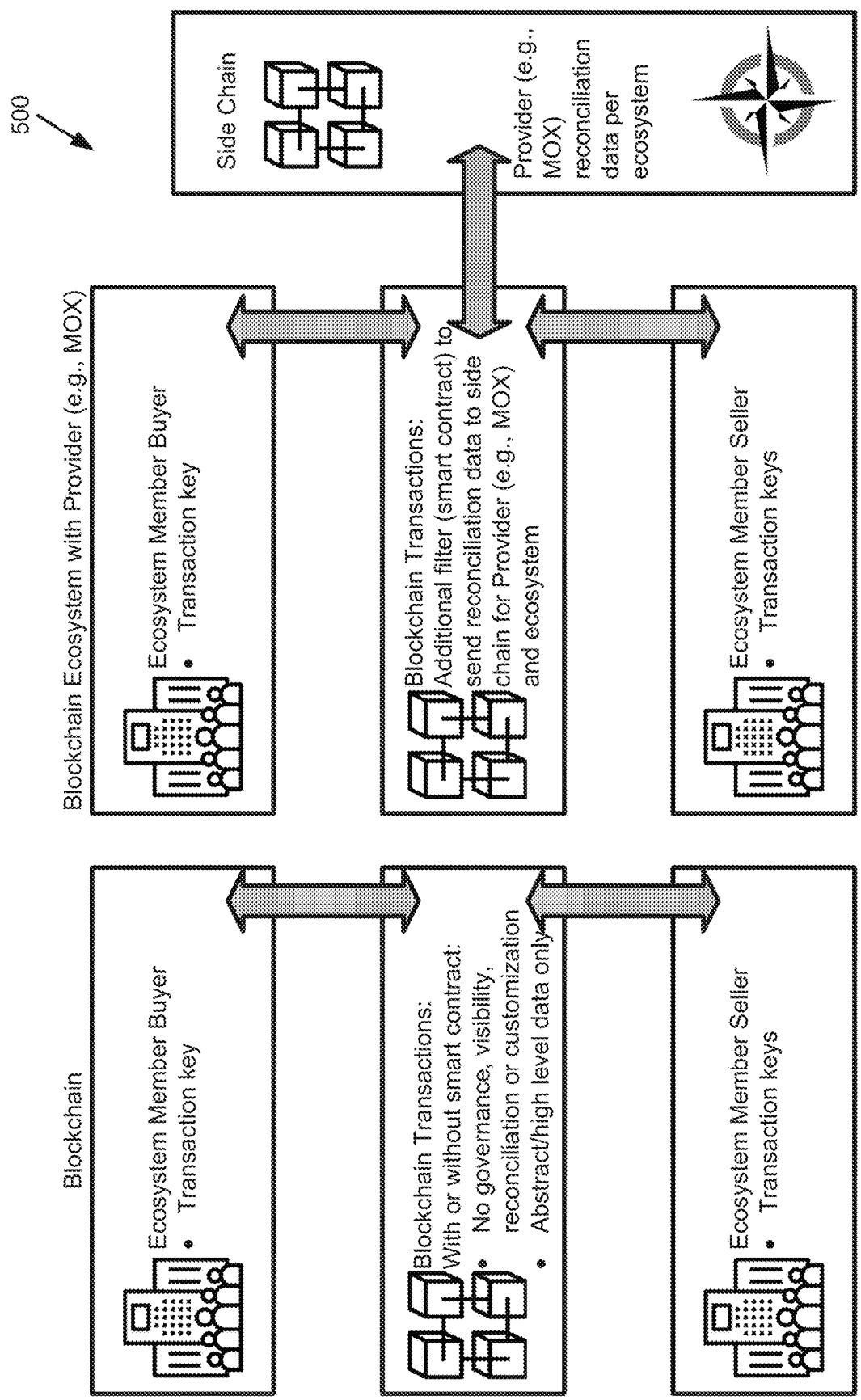
FIG. 5 is another schematic diagram associated with a network ecosystem, according to some embodiments of this disclosure.

FIG. 5 is another schematic diagram associated with a network ecosystem 500, according to some embodiments of this disclosure. In some embodiments, a blockchain network ecosystem is provided. A first user may use a transaction key associated with the blockchain network ecosystem to perform a first transaction (e.g., a purchase transaction). A second user may use the same transaction key or another transaction key associated with the blockchain network ecosystem to perform a second transaction (e.g., a sale transaction). The first transaction and the second transaction may comprise one or more parts of the same transaction. In some embodiments, a filter may be provided in the blockchain network ecosystem in the form of a smart contract. The filter facilitates the first and/or the second transaction. The filter facilitates sending of reconciliation data associated with the first and/or the second transaction to a "side" reconciliation chain. A "side" reconciliation chain may be provided for each blockchain network ecosystem (or for one or more blockchain network ecosystems). In some embodiments, the "side" reconciliation chain may be used to reconcile data associated with the first and/or the second transaction. The "side" reconciliation chain enables more visibility and utility into transactions or operations such as the first transaction and/or the second transaction. This means that information or data associated with the first transaction and/or the second transaction may be viewed or obtained by remote servers that have access to any of the systems or networks described herein. Therefore, systems and methods in the present disclosure may eliminate anonymity or opaqueness associated with transactions performed in blockchain networks and/or systems.

A computing environment 600 (see FIG. 6) associated with or comprised in any of the entities and/or computing systems (including distributed ledger-based systems, blockchain systems, hybrid systems, etc.) described and/or illustrated herein may include general hardware, specifically-purposed hardware, and/or specially purposed-software.

The computing environment may include, among other units, a processor, a memory unit (simply called memory), an input/output (I/O) unit, a communication unit, a resource allocator, a location determinator, and an API unit. Each of the processor, the memory unit, the I/O unit, and/or the communication unit may include and/or refer to a plurality of respective units, sub-units, and/or elements. The various units may be implemented entirely in hardware, entirely in software, or in a combination of hardware and software. Some of the units may be optional. Any software described herein may be specially purposed software for performing a particular function. In some embodiments, hardware may also be specially purposed hardware for performing some particular functions. Furthermore, each of the processor, the memory unit, the I/O unit, the communication unit, and/or the other units, may be operatively and/or otherwise communicatively coupled with each other using a chipset such as an intelligent chipset. The chipset may have hardware for supporting connections in the computing environment and connections made to external systems from the computing environment. Some of the units may be comprised in other units. Additionally, some of the units may be optional. Additionally, one or more units may be coupled or connected (e.g., via a wired or wireless connection) to other units.

The processor may control any of the other units and/or functions performed by the units. Any actions described herein as being performed by a processor may be taken by the processor alone and/or by the processor in conjunction with one or more additional processors, units, and/or the like. Multiple processors may be present and/or otherwise included in the computing environment. Thus, while instructions may be described as being executed by the processor, the instructions may be executed simultaneously, serially, and/or by one or multiple processors in parallel. In some embodiments, the processor may refer to any microprocessor, such as a specially purposed microprocessor. In some embodiments, the processor may refer to any type of processor, including a digital processor, an analog processor, a mixed analog-digital processor, etc. In some embodiments, the processor(s) may be specifically designed for use in or associated with distributed ledger systems, blockchain systems, etc.

In some embodiments, the processor may be implemented as one or more computer processor (CPU) chips and/or graphical processor (GPU) chips and may include a hardware device capable of executing computer instructions. The processor may execute instructions, codes, computer programs, and/or scripts. The instructions, codes, computer programs, and/or scripts may be received from and/or stored in the memory unit, the I/O unit, the communication unit, other units, and/or the like. As described herein, any unit may be utilized to perform any methods described herein. In some embodiments, the computing environment may not be a generic computing system, but instead may include customized units designed to perform the various methods described herein.

In some embodiments, the processor may include one or more other units, which may be operably coupled to each other. Therefore, while the units are presented as being separate from the processor, the memory unit, the I/O unit, and the communication unit, in some embodiments, one or more units may be located in at least one of the processor, the memory unit, the I/O unit, and the communication unit.

The location determinator may facilitate detection, generation, modification, analysis, transmission, and/or presentation of location information (e.g., of any computing device described herein). Location information may include global positioning system (GPS) coordinates, an Internet protocol (IP) address, a media access control (MAC) address, geolocation information, an address, a port number, a zip code, a server number, a proxy name and/or number, device information (e.g., a serial number), and/or the like. In some embodiments, the location determinator may include various sensors, a radar, and/or other specifically-purposed hardware elements for enabling the location determinator to acquire, measure, and/or otherwise transform data of a computing device such as a computing device into location information. In some embodiments, the location determination may be located in the processor.

The resource allocator may facilitate the determination, monitoring, analysis, and/or allocation of computing resources throughout the computing environment. As such, computing resources of the computing environment utilized by the processor, the memory unit, the I/O unit, the communication unit, and/or any other units of the computing environment, such as processing power, data storage space, network bandwidth, and/or the like may be in high demand at various times during operation. Accordingly, the resource allocator may be configured to manage the allocation of various computing resources as they are required by particular units of the computing environment. In some embodiments, the resource allocator may include sensors and/or other specially-purposed hardware for monitoring performance of each unit and/or sub-unit of the computing environment, as well as hardware for responding to the computing resource needs of each unit and/or sub-unit. In some embodiments, the resource allocator may utilize computing resources of a second computing environment separate and distinct from the computing environment to facilitate a desired operation. Therefore, in some embodiments any processor may be referred to as a load-balancing processor. Any apparatus described herein may be referred to as load-balancing apparatus or server. The term load-balancing may refer to allocation of computing resources to the various units of the computing environment.

For example, the resource allocator may determine a number of computing operations that need to be performed or executed by the computing environment. The resource allocator may then determine that the number of computing resources required by the computing operations meets and/ or exceeds a predetermined threshold value. Based on this determination, the resource allocator may determine an amount of additional computing resources (e.g., processing power, storage space of a particular non-transitory computer-readable memory medium, network bandwidth, and/or the like) required by the processor, the memory unit, the I/O unit, the communication unit, and/or any sub-unit of the aforementioned units for enabling safe and efficient operation of the computing environment while supporting the number of simultaneous computing operations. The resource allocator may then retrieve, transmit, control, allocate, and/or otherwise distribute determined amount(s) of computing resources to each unit of the computing environment. In some embodiments, the allocation of computing resources of the resource allocator may include the resource allocator flipping a switch, adjusting processing power, adjusting memory size, partitioning a memory element, transmitting and/or receiving data, controlling one or more input and/or output devices, modifying various communication protocols, and/or the like. In some embodiments, the resource allocator may facilitate utilization of parallel processing techniques, e.g., for parallel computing operations. A computing operation may refer to any operation, function, method, process, etc., described in this disclosure. In some embodiments, the resource allocator may be located in the processor.

The memory unit and/or any of its sub-units may include distributed ledger systems, blockchain systems, random access memory (RAM), read only memory (ROM), and/or various forms of secondary storage. RAM may be used to store volatile data and/or to store instructions that may be executed by the processor and/or any of the other units of the computing environment. For example, the data stored may be a command, a current operating state of the computing environment and/or any particular unit of the computing environment, an intended operating state of the computing environment and/or any particular unit of the computing environment, and/or the like. As a further example, data stored in the memory unit may include instructions related to various methods and/or functionalities described herein. ROM may be a non-volatile memory device that may have a smaller memory capacity than the memory capacity of a secondary storage. ROM may be used to store instructions and/or data that may be read during execution of computer instructions. In some embodiments, access to both RAM and ROM may be faster than access to secondary storage. Secondary storage may be comprised of one or more disk drives and/or tape drives and may be used for non-volatile storage of data or as an over-flow data storage device if RAM is not large enough to hold all working data. Secondary storage may be used to store programs that may be loaded into RAM when such programs are selected for execution. In some embodiments, the memory unit may include one or more databases for storing any data described herein. Additionally or alternatively, one or more secondary databases located remotely from the computing environment may be utilized and/or accessed by the memory unit.

The API unit may facilitate deployment, storage, access, execution, and/or utilization of information associated with APIs of the computing environment. Some of the APIs may be particularly designed with regard to distributed ledger systems, blockchain systems, etc. In some embodiments, the API unit may be located in the memory unit, while in other embodiments, the API unit may be located separate from the memory unit. The API unit may enable the various units of the computing environment to communicate with each other and/or perform computing operations described herein. Accordingly, the API unit may include API databases comprising information that may be accessed and/or utilized by applications and/or operating systems of other devices and/or computing environments. In some embodiments, each API database may be associated with a customized physical circuit included in the API unit. Additionally, each API database may be public and/or private, and so authentication credentials may be required to access information in an API database.

Any aspect of the memory unit may comprise any collection and arrangement of volatile and/or non-volatile components suitable for storing data. For example, the memory unit may comprise random access memory (RAM) devices, read only memory (ROM) devices, magnetic storage devices, optical storage devices, and/or any other suitable data storage devices. In particular embodiments, the memory unit may represent, in part, computer-readable storage media on which computer instructions and/or logic are encoded. The memory unit may represent any number of memory components within, local to, and/or accessible by a processor.

The I/O unit may include hardware and/or software elements for enabling the computing environment to receive, transmit, present data. For example, elements of the I/O unit may be used to receive, transmit, present data. In this manner, the I/O unit may enable the computing environment to interface with a human user. As described herein, the I/O unit may include an I/O device. The I/O device may facilitate the receipt, transmission, processing, presentation, display, input, and/or output of data as a result of executed processes described herein. In some embodiments, the I/O device may include a plurality of I/O devices. In some embodiments, the I/O device may include one or more elements of a signal system, a computing device, a server, and/or a similar device.

The I/O device may include a variety of elements that enable a user to interface with the computing environment. For example, the I/O device may include a keyboard, a touchscreen, a touchscreen sensor array, a mouse, a stylus, a button, a sensor, a depth sensor, a tactile input element, a location sensor, a biometric scanner, a laser, a microphone, a camera, and/or another element for receiving and/or collecting input from a user and/or information associated with the user and/or the user's environment. Additionally and/or alternatively, the I/O device may include a display, a screen, a projector, a sensor, a vibration mechanism, a light emitting diode (LED), a speaker, a radio frequency identification (RFID) scanner, and/or another element for presenting and/or otherwise outputting data to a user. In some embodiments, the I/O device may communicate with one or more elements of the processor and/or the memory unit to execute operations described herein.

The communication unit may facilitate establishment, maintenance, monitoring, and/or termination of communications between the computing environment and other systems, units, etc. The communication unit may further enable communication between various units of the computing environment. The communication unit may facilitate establishment, maintenance, and/or termination of a communication connection between the computing environment and another device by way of a network or directly. For example, the communication unit may detect and/or define a communication protocol required by a particular network and/or network type. Communication protocols utilized by the communication unit may include Wi-Fi protocols, Li-Fi protocols, cellular data network protocols. Bluetooth® protocols, WiMAX protocols, Ethernet protocols, powerline communication (PLC) protocols. Voice over Internet Protocol (VoIP), other wired or wireless protocols, and/or the like. In some embodiments, facilitation of communication between the computing environment and any other device, as well as any element internal to the computing environment, may include transforming and/or translating data from being compatible with a first communication protocol to being compatible with a second communication protocol. In some embodiments, the communication unit may determine and/or monitor an amount of data traffic to consequently determine which particular network protocol is to be used for transmitting and/or receiving data.

The communication device may include a variety of hardware and/or software specifically purposed to enable communication between the computing environment and another device, as well as communication between elements of the computing environment. In some embodiments, the communication device may include one or more radio transceivers, chips, analog front end (AFE) units, antennas, processors, memory, other logic, and/or other components to implement communication protocols (wired or wireless) and related functionality for facilitating communication between the computing environment and any other device. Additionally and/or alternatively, the communication device may include a modem, a modem bank, an Ethernet device such as a router or switch, a universal serial bus (USB) interface device, a serial interface, a token ring device, a fiber distributed data interface (FDDI) device, a wireless local area network (WLAN) device and/or device component, a radio transceiver device such as code division multiple access (CDMA) device, a global system for mobile communications (GSM) radio transceiver device, a universal mobile telecommunications system (UMTS) radio transceiver device, a long term evolution (LTE) radio transceiver device, a worldwide interoperability for microwave access (WiMAX) device, and/or another device used for communication purposes.

It is contemplated that the computing elements of the computing environment be provided according to the structures disclosed herein may be included in integrated circuits or chipsets of any type, such as ROM. RAM (random access memory), DRAM (dynamic RAM), and video RAM (VRAM), PROM (programmable ROM), EPROM (erasable PROM), EEPROM (electrically erasable PROM). EAROM (electrically alterable ROM), caches, and other memories, and to microprocessors and microcomputers in all circuits including ALUs (arithmetic logic units), control decoders, stacks, registers, input/output (I/O) circuits, counters, general purpose microcomputers. RISC (reduced instruction set computing), CISC (complex instruction set computing) and VLIW (very long instruction word) processors, and to analog integrated circuits such as digital to analog converters (DACs) and analog to digital converters (ADCs). ASICS, PLAs, PALs, gate arrays and specialized processors such as processors (DSP), graphics system processors (GSP), synchronous vector processors (SVP), distributed ledger systems, blockchain systems, and image system processors (ISP) all represent sites of application of the principles and structures disclosed herein.

In some embodiments, implementation of any unit of any system described herein is contemplated in discrete components or fully integrated circuits in silicon, gallium arsenide, or other electronic materials families, as well as in other technology-based forms and embodiments. It should be understood that various embodiments of the invention can employ or be embodied in hardware, software, microcoded firmware, or any combination thereof. When an embodiment is embodied, at least in part, in software, the software may be stored in a non-volatile, machine-readable medium.

The computing environment may include, but is not limited to, computing grid systems, distributed computing environments, cloud computing environment, distributed ledger systems, blockchain systems, hybrid network systems, etc. Such networked computing environments include hardware and software infrastructures configured to form a virtual network organization comprised of multiple resources which may be in geographically disperse locations.

In some embodiments, the enterprise network is associated with an entity or a physical product or a digital product, and a node of the enterprise network comprises at least one of a user, a vendor, a supplier, a buyer, a seller, a customer, a transaction initiator, a transaction receiver, a human, a robot, a computing device such as an automated computing device, etc. In some embodiments, the physical product or asset may be a metal, a non-consumable, a consumable, a plant (e.g., *cannabis*) or plant-based product or derivative, cash (e.g., associated with a particular location or currency), a thing, etc. In some embodiments, the digital product may be a pure digital asset or a digital representation of a physical product or asset. In some embodiments, the physical product is consumable by a human being for recreational use. In some embodiments, the physical product is consumable by a human being for medicinal use. In some embodiments, the enterprise network is associated with at least one of an entity (e.g., a hotel, an airline, a restaurant, etc.). In some embodiments, the digital token does not comprise a cryptocurrency, though in other embodiments, it might comprise a cryptocurrency. In some embodiments, the digital token does not comprise a speculative token, though in other embodiments, it might comprise a speculative token for trading on an exchange.

In one embodiment, a platform for e-transactions (e.g., e-commerce) and data management is presented in this disclosure. The platform may allow efficient day-to-day transactions at lower operating costs using proprietary reconciliation and data management between multiple entities. In some cases, the platform facilitates secure and transparent data observance for regulators and other third parties monitoring one or more transactions between the multiple entities. The multiple entities may be one or more individuals, one or more organizations, or a combination thereof.

In some embodiments, the private ecosystem architecture of the platform has significant benefits for high impact retail chains, healthcare systems, government agencies, and large-scale project driven enterprises. For retail chains, the platform lowers costs, enhances customer loyalty, and provides asset transfer solutions at very cheap prices as discussed below. For the healthcare systems, the platform provides an integrated patient and provider data management system, payment, and clearing solutions. For the government agencies, the platform improves efficiency and cost savings for project assessment and procurement, licensing and payments, domestic and international aid management, etc.

The reconciliation functions of the platform create a short cycle operation and settlement (SCOS), dramatically lowering the time and effort to clear, secure and reconcile a wide variety of data driven functions. The platform also creates value add services utilizing artificial intelligence (AI) and machine learning (ML) using data generated from other applications integrated into the platform.

In one embodiment, the platform yields models that can simultaneously work together. These models include blockchain as a service (BaaS), transaction costs (e.g., fees), and data revenue. The platform uses to the BaaS model to provide access to transactions, to scale transactions, and to distribute and predict the software as a service (SaaS) model. The platform uses the transaction fees model to calculate costs associated with a transaction, and offer payment solutions for each transaction as needed. The platform also uses the data revenue model to engage the AI and ML tools of the platform to run analytics on user/entity data associated with transactions.

Additionally, the platform can provide a closed loop transaction and asset transfer solution that allows entities to transmit and receive assets. For instance, assets may comprise digital tokens, digital currencies, digital sureties, etc., that entities transmit and receive among themselves. In some cases, the platform minimizes third-party operating costs as well as other charges associated with asset transfers in order to make asset transfers between entities profitable for stakeholders (e.g., platform providers). In some instances, the platform includes a "know your customer" (KYC) and anti-asset laundering (AAL) (e.g., anti-money laundering) functionality for compliance purposes. Some embodiments of the platform include a data analytics feature powered by an AI and/or an ML tool. Additionally, the platform may streamline settlements to entities and integration into other systems. Moreover, the platform executes operations in a manner that does not require entities to change much in terms of their actions when executing transactions.

In some implementations, the platform is based on blockchain technology that is optimized for transactions between entities. In some embodiments, the optimized (or augmented) blockchain technology may be referred to as speedchain technology. In one embodiment, the speedchain technology relies on a secured distributed ledger that records transactions between entities chronologically, permanently, and unalterably. Additionally, speedchain technology may leverage pre-established smart contracts between entities during transactions between the entities. This beneficially negates the need to use traditional database structures that are often reliant on human data entry and security. Additionally, smart contracts can trigger transactions between entities based on a specific logic, and/or based on AI tools, and/or based on ML tools. All these ensure that records associated with transactions between entities are immutable. Also, the speedchain technology architecture ensures data redundancy and information transparency. Moreover, speedchain technology shortens the time required to conduct transactions between entities by eliminating intermediaries. In one embodiment, speedchain provides a data source of truth with distribution and security through a knowable private ecosystem rather than the distributed anonymous organization employed in most blockchain architectures.

Furthermore, speedchain technology can provide secure access to data for entities associated with the private ecosystem. In some instances, speedchain technology allows ease of transactions (e.g., commerce), data entry consistency, and information sharing. As previously mentioned speedchain technology leverages blockchain technology and integration points to aggregate data. In some cases, speedchain technology creates a protected transactional and custodial history, useable for AI and machine learning. Further, speedchain can provide a single source tracking, a universal dashboard for observing transactions, improve performance of the platform, and reduce costs.

As an example, a first entity may initiate a transaction (e.g., asset transfer, digital asset transfer, etc.) using an application associated with the platform and/or using a first physical location (e.g., store) associated with the platform. In the embodiment where the transaction is initiated at a first physical location associated with the platform, the first entity may provide a first currency of transaction to a first associate at the first physical location. This first currency of transaction may be, of example, a token, digital token, digital sureties, or some other form of transferable asset (e.g., money). The first associate then feeds relevant information associated with the transaction to the platform. In the case of an application associated with the platform, the first entity may directly feed the platform with the relevant information associated with the transaction. Relevant information associated with the transaction may include asset amount, location where transaction was initiated, identification data associated with the first entity, identification data associated with a second entity to with which the first entity is conducting the transaction, location of the second entity, a transaction ID associated with the transaction, a timestamp associated with the transaction, an ID associated with the first associate if an application is not used, etc. The platform then processes the relevant information associated with the transaction based on one or more features of speedchain technology. For instance, the platform may process the relevant information using the KYC and the AAL functionality as well as documenting the transaction. In the embodiment where the transaction comprises an asset transfer, the asset is made available to the second user either via an application associated with the platform or via a second location associated with the platform. In some cases, the second entity is notified about asset availability once the platform processes the relevant information. After the second entity acquires a transferred asset resulting from the transaction, the platform verifies the completion of the transaction and records the completion of the transaction on the distributed ledger.

In one embodiment, the transaction involves an asset transfer request and a receive request comprised in a three-step process. The first step may involve the first entity initiating, for example, an asset transfer request. The identity of the first entity may be verified by the either an application associated with the platform or a first associate connected to the platform. Responsive to verifying and confirming the right identity of the first entity, the asset transfer request is submitted to speedchain aspects of the platform via a dedicated integration. The speedchain then administers KYC and/or AAL on the transaction via a dedicated third party integration. In one embodiment, the platform includes a systemized blockchain reconciliation (SyBR) feature which initiates issuance of smart contracts between two or more entities. For example, the SyBR aspect of the platform may transfer assets from the platform based on the transaction between the first entity and the second entity to the second entity. In some embodiments, the platform includes a RECON feature (which is further discussed below). This RECON feature may allow stakeholders (e.g., first entity, second entity, administrators of the platform, etc.) associated with the transaction to view details associated with the asset transfer request.

At a second stage of the transaction, the speedchain aspects of the platform may trigger or send notifications to the first entity and/or the second entity about one or more assets resulting from the transaction. This notification may be in the form of email, SMS, Push (mobile to mobile), phone call, etc.

At the third stage of the transaction, the second entity may initiate a receive request for an available asset resulting from the transaction. A second associate connected to the platform and/or another application associated with the platform verifies the identity of the second entity. The receive request may be submitted to the speedchain aspect of the platform via a dedicated integration. In one embodiment, the speedchain aspect of the platform administers a KYC and/or an AAL on the receive request via a dedicated third-party integration. In one embodiment, the SyBR aspect of the platform initiates transfer of the available asset from a platform account to the account of the second entity. In some cases, the RECON feature of the platform allows stakeholders associated with the transaction to view details associated with the receive request.

In order to prevent asset laundering and/or other illegal transaction on the platform, the platform may execute compliance operations for its administrators (e.g., first associate connected to the platform, second associate connected to the platform, etc.). In one embodiment, the platform implements a KYC policy and a know your associate (KYA) policy to ensure compliance with transaction laws. In some embodiments, the platform implements training for its administrators. Additionally, the speedchain aspects of the platform may include a watch list of suspicious transactions, and monitoring mechanisms that track a volume, and/or frequency, and/or velocity associated with certain transactions. Additionally, personalized data and analytics can be generated using the AI and/or ML features of the platform to analyze suspicious transactions. Additionally, because of the omni-channel data distribution inherent in some embodiments of the platform, tracking and monitoring of transactions by all stakeholders is greatly simplified.

For regulatory purposes, the speedchain aspects of the platform can facilitate avoiding transaction structuring by an associate connected to the platform. By this is meant that the platform has built-in protocols that prevent an associate connected to the platform from knowingly executing an illegal transaction. Moreover, the platform is designed to prohibit the repeat transfer of assets without drawing the attention of stakeholders. Further, the platform is built, in some embodiments, to prohibit multiple reception of assets due to a suspicious transaction by the same recipient (e.g., second entity) even when the recipient varies receipt locations. In other embodiments, the platform includes a fraud alert and prevention system that notifies stakeholder in real-time or pseudo real-time of suspicious transactions occurring on the platform.

The platform in one embodiment includes a SyBR feature configured for parameterized blockchain data management. In some instances, the SyBR feature allows preapproved stakeholders seamless access to data. In other cases, the SyBR feature distributes data and enhances data security on the platform. Moreover, the SyBR feature can prevent unauthorized access to the platform. Additionally, the SyBR feature may ensure that the platform is AI and/or ML compatible.

In other embodiments, the platform includes a preselected issuance and data operations loop (PAIDOL) feature. This feature of the platform deals with asset ownership and transactional security on the platform. In one embodiment, the PAIDOL feature improves security on the platform by connecting issuance and custodial information to every transaction on the platform. In some cases, the PAIDOL feature facilitates KYC and/or AAL compliance on the platform.

In some embodiments, the platform includes RECON Smart Contract (simply referred to as RECON) feature that manages smart contracts on the platform. A smart contract may be a self-executing contract with terms of agreement between two or more entities on the platform directly written into lines of code. The code and the agreements contained therein exist across the blockchain associated with the platform. In one instance, the RECON feature allows for permissioned functions and side chains to capture and process transaction data. In some cases, the RECON feature assists in data reporting and data transparency for stakeholders (e.g., first entity, second entity, platform administrator, regulators, etc.). Additionally, the RECON feature allows the platform to be integrated into other enterprise applications or vice versa.

In other embodiments, the platform includes a combination of the SyBR feature and the PAIDOL feature. In some cases the platform includes a combination of the SyBR feature and the RECON feature. In some cases the platform includes a combination of the PAIDOL feature and the RECON feature. In further embodiments the platform includes a combination of the SyBR feature, the PAIDOL feature, and the RECON feature.

In one embodiment, the platform optimized blockchain on which the platform is based includes an independent blockchain network for executing transactions. It is appreciated that the transactions described do not include, in some embodiments, an initial coin offering like most cryptocurrencies.

Figure 7:
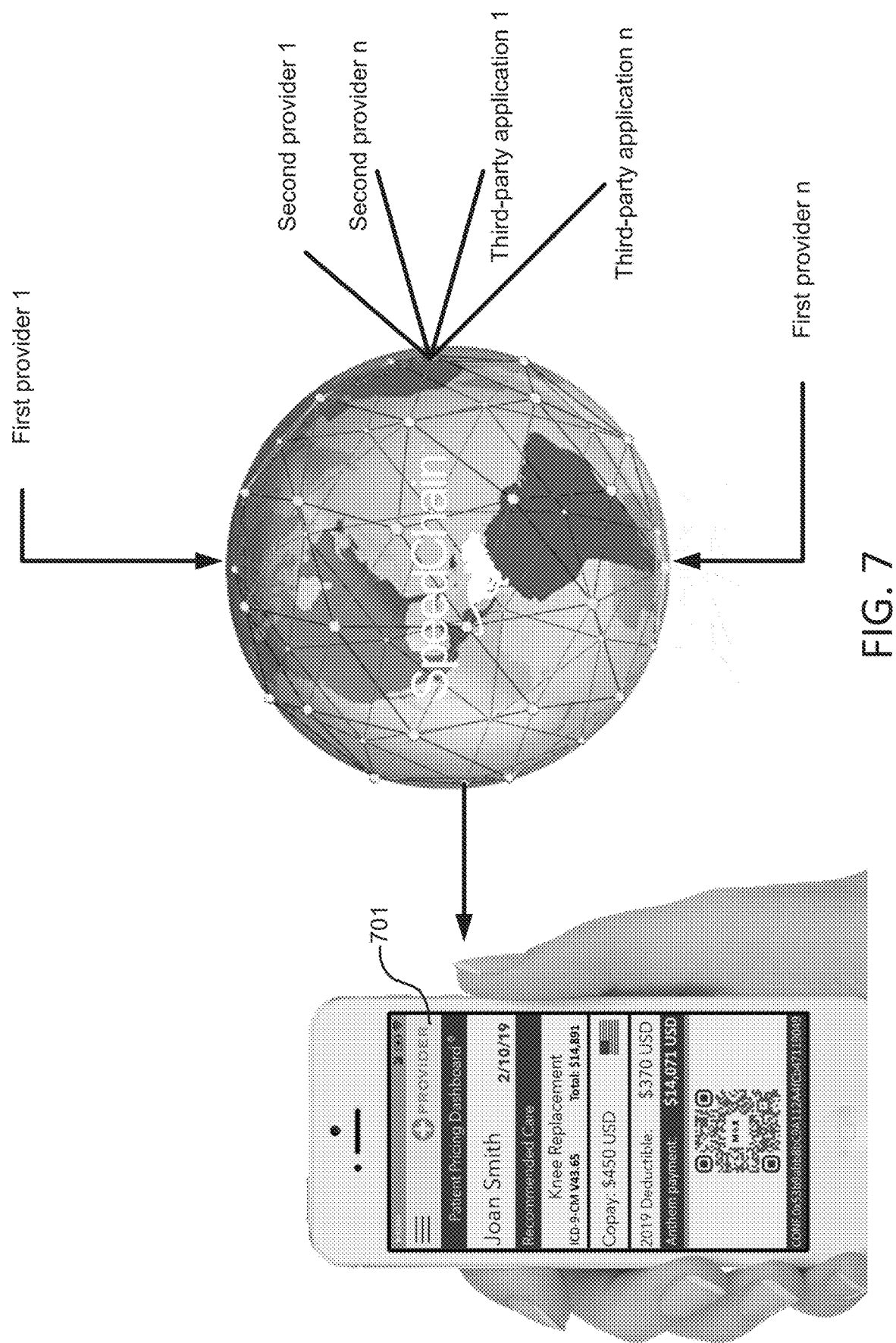
FIG. 7 is an example diagram of the platform adapted for transactions between entities associated with a healthcare system, according to some embodiments of this disclosure.

In some embodiments, the platform may be adapted for transactions between entities associated with a healthcare system. For instance, and as shown in FIG. 7, the platform may be communicatively coupled to a graphical user interface (GUI) 701 including a patient pricing dashboard, and/or a payment form for real-time or pseudo real-time payments, and/or data personalization and analytics linked to the GUI, and/or an omni-channel access to data for stakeholders such as patients, doctors, and platform operators or administrators. The platform in this case may include a coding optimization process (COP) and a tokenized recon code smart-contract associated with the speedchain. In such cases, the COP may be based on an AI assisted key word to an International Classification of Diseases (ICD).

Additionally, the platform may facilitate a short billing and settlement cycle for stakeholders such as patients. Moreover, the platform can also provide dynamic staffing of healthcare providers using the AI and/or the ML features of the platform. Further, the platform may enable inter-departmental integration of a plurality of departments associated with a given healthcare system.

TABLE 1

| Key Differentiators | MOX |
| --- | --- |
| SmartContracts custom-designed per eco-system | Yes |
| Tokens backed by physical asset (FIAT currency) | Yes |
| Permissioned blockchain | Yes |
| Network agnostic (Quorum, Eth, Hyperledger etc) | Yes |
| Hybrid blockchain (Permissioned tx & Public tx) | Yes |
| Tokens airdropped by eco-system | Yes |
| Reconciliation Smart contract for data analysis | Yes |
| KYC for banks and participants | Yes |
| AML and Machine learning fraud detection | Yes |
| Financial reporting of reconciliation data | Yes |
| Transactions are settled immediately on-chain | Yes |
| Immediate Clearing, reducing total transaction costs | Yes |
| API Integration support with token issuer | Yes |
| API integration for Mobile, Web/Web3 | Yes |
| Wallet based transaction support | Yes |
| Transaction Privacy (only visible to concerned party) | Yes |
| Net positions support for all parties | Yes |
| Wallet support/SMS/QR code support for users for efficient e-commerce | Yes |
| Data analysis support & ML for enhanced UX | Yes |
| Tradeable cryptocurrency (ICO) | No |
| Independent blockchain network | No |

In some embodiments, the platform integrates data from the ecosystem (e.g., the community of stakeholders) partners including ICD codes, pricing, and insurer information. In such embodiments, the platform may reconcile data and populate one or more forms associated with GUI's connected to the platform. Moreover, the platform may monitor issuance and activity associated with transactions performed on the platform. In some cases, the platform processes patient data and can allow patients to view, via a GUI, real-time costs at any point of diagnosis. The platform may also be tied to a copay on a dashboard communicatively coupled to the GUI. Additionally, the GUI may allow the patient to view all activity via an application or via an online web browser. It is appreciated that the embodiment of the platform related to healthcare systems may include the SyBR feature, the PAIDOL feature, the RECON feature, or a combination thereof.

Figure 8:
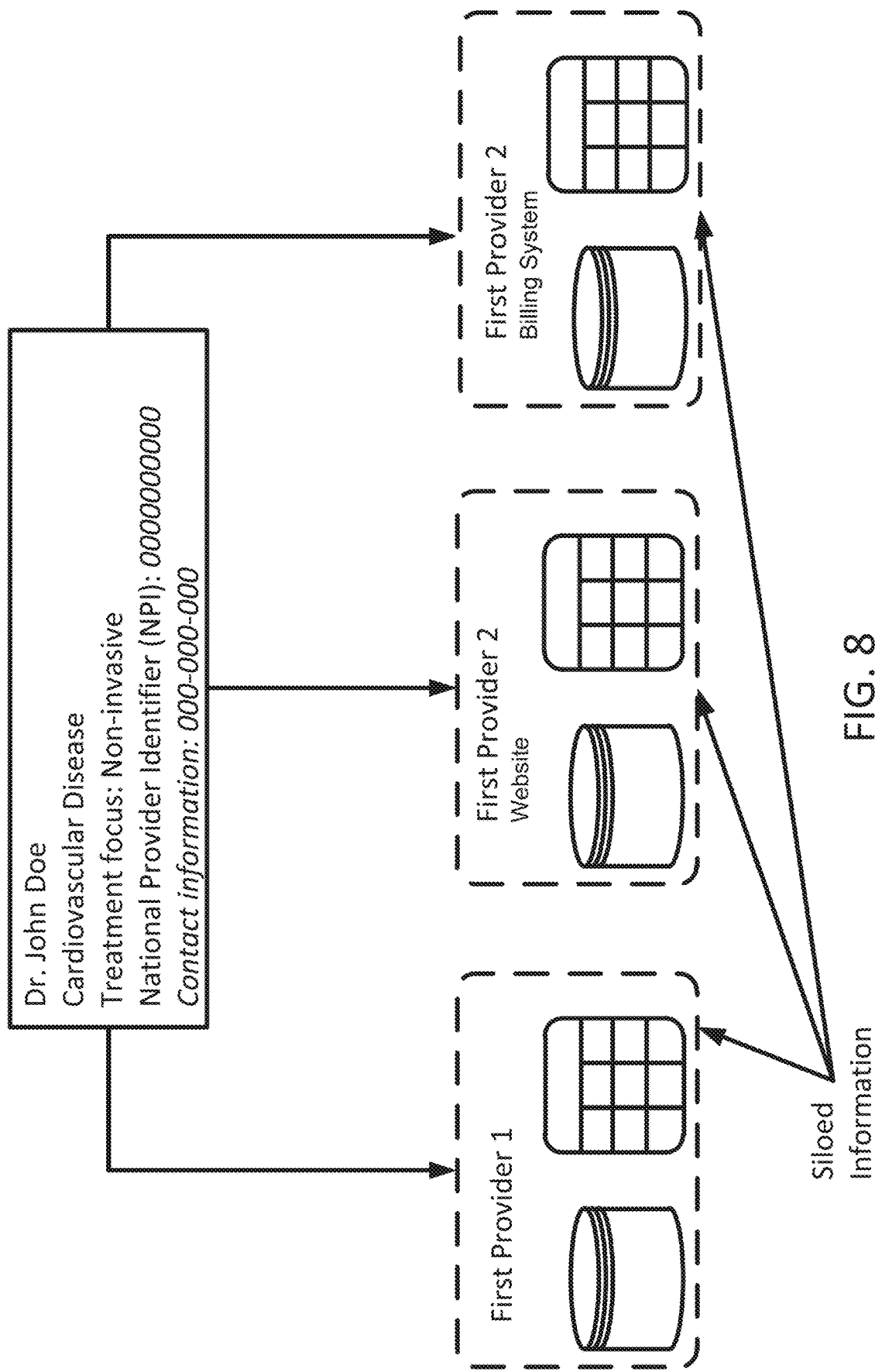
FIG. 8 is a siloed architecture of the platform, according to some embodiments of this disclosure.
Figure 9:
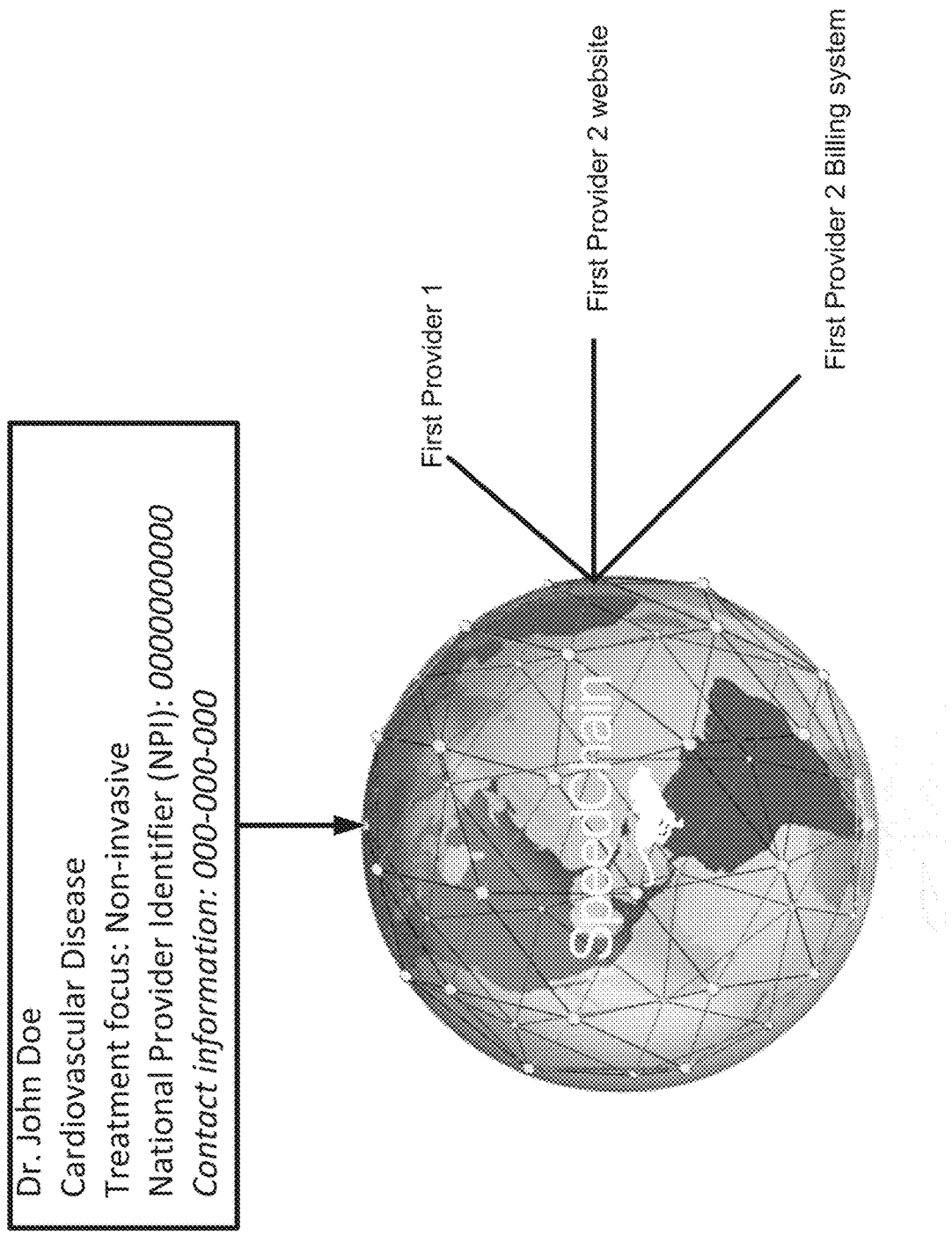
FIG. 9 shows a single point of information adaptation of the platform, according to some embodiments of this disclosure.

By way of example, the platform can serve as a single point (e.g., source) of truth for data associated with stakeholders. For example, while the platform can ensure that information from multiple providers are appropriately siloed as shown in FIG. 8, for example, the platform in some cases can be adapted to serve as a single point of information as shown in FIG. 9 thus negating the need for having multiple siloed data.

The benefits of the healthcare related embodiment of the platform include, among other things, more transparency for patients, easy to use for patients and other stakeholders, cost awareness, multiple payment options, wellness pricing, increased efficiency, cost reduction, data integration, patient retention, AI and ML functionality, predictive analytics, etc.

Table 1 above provides a summary of some of the features included in the platform. The platform may be part of or integrated into one or more ecosystems or environments described herein. The last two rows of the table indicate that the platform does not include tradeable cryptocurrencies nor is the platform based on an independent blockchain network.

In one embodiment, the platform facilitates process efficiency, process transparency, and process accountability solutions for government agencies. For instance, government agencies may use the platform to restore tourism and recreational opportunities, address critical county and municipal road repairs, rebuild local government infrastructure, rebuild education facilities and increase investment in schools (e.g., K-12 schools), restore critical life-safety services to panhandle communities, and provide affordable housing for displaced families. In accomplishing all this, the platform may provide: data transparency to stakeholders; pricing awareness to stakeholders; AI and ML tools for project optimization; project health or project status data to stakeholders; cross project integration; and cost reduction.

In one embodiment, the platform is used as a solution to address climate issues. More specifically, the platform can be used to provide a sustainable development goal (SGD) that leads to performance improvement using a blockchain ecosystem. In some embodiments, the performance improvements include new distribution capability (NDC) tracking, comparative effectiveness research (CER) and AAU data management, International transaction log monitoring, pre-Conference of the Parties 25 (COP 25) advancements, better use cases for climate neutral now initiative, and better results through AI and ML usage.

To reiterate, the speedchain technology on which the platform is based configured to set up private ecosystems for entities to conduct commerce with data components on both public and private blockchain environments. S.P.E.E.D. or Secure Private Ecosystems for Enterprise Deployment sets out to create private ecommerce environments that have more security, speed and lower cost than a traditional ecommerce platforms. The technology components of speedchain include SyBR, and/or PAIDOL, and/or RECON Smart Contract, or a combination thereof. Members or entities within the ecosystem can set up a unique private key that will allow them to perform activity within the ecosystem. The members include company employees, customers, regulators, vendors etc.

SyBR's function include: setting pre-established rules of the road for conducting transactions within a certain ecosystem?; what functions (e.g., buying and selling, sending information, tracking a device, the parameters of activity (how much does something cost)) will be carried out within the ecosystem?; what temperature does something have to be before sending an alert to a stakeholder?; how much is a limit for an asset transfer at a single location?; during what time frame or within a certain geography is an asset transfer allowed?; etc. These parameters/functions are included in: the issuance smart contract and are then repeated in the RECON smart contract which allows the reporting on the data operation carried out in the issuance contract. SyBR can also launch both the issuance and RECON smart contract within the technology system of Speedchain.

Other details associated with SyBR include a parameterized blockchain data management that: allows preapproved stakeholders seamless access to data; distributes data; enhances security on the platform; prevents unauthorized access to the platform; and that allows for AI/ML capability.

The RECON smart contract is designed to either coexist with an issuance smart contract or operate as a stand-alone smart contract. The purpose of the RECON smart contract is to utilize an additional set of private keys to a blockchain or a distributed ledger technology (DLT) transaction or communication with the purpose of extracting reconciliation information from the issuance contract and collecting the data onto a side chain. The data is then used for reporting purposes. Managing the RECON Smart contract: allows for permissioned functions and side chains to capture and process transaction data; assists in the ease of use for reporting and transparency of data; and allows for Integration into third party Enterprise Resource Planning (ERP) solutions.

PAIDOL is another major differentiator for speedchain versus other blockchain solutions. For every member of an ecosystem, a preapproved issuance ID is associated with the creation of their private key. It is important to note that speedchain does not have access to any member's private key but it does associate a PAIDOL # associated with the creation of the key to transactions. This identifier is then associated with all activity within the ecosystem. This concept is important as it relates to: consent for the sharing of health records; tracking usage for money transfers and AAIJKYC; quality assurance for accounting personnel; and Know Your Resident (KYR) information. In one embodiment, the KYR is a version of the KYC.

Moreover, the platform includes ownership and transactional security that improves security by connecting issuance and custodial information to every transaction. The platform also assists in KYC/AAL compliance. In one embodiment, the platform comprises a hybrid ecosystem including blockchain technology, speedchain technology, and an endpoint device.

Figure 6:
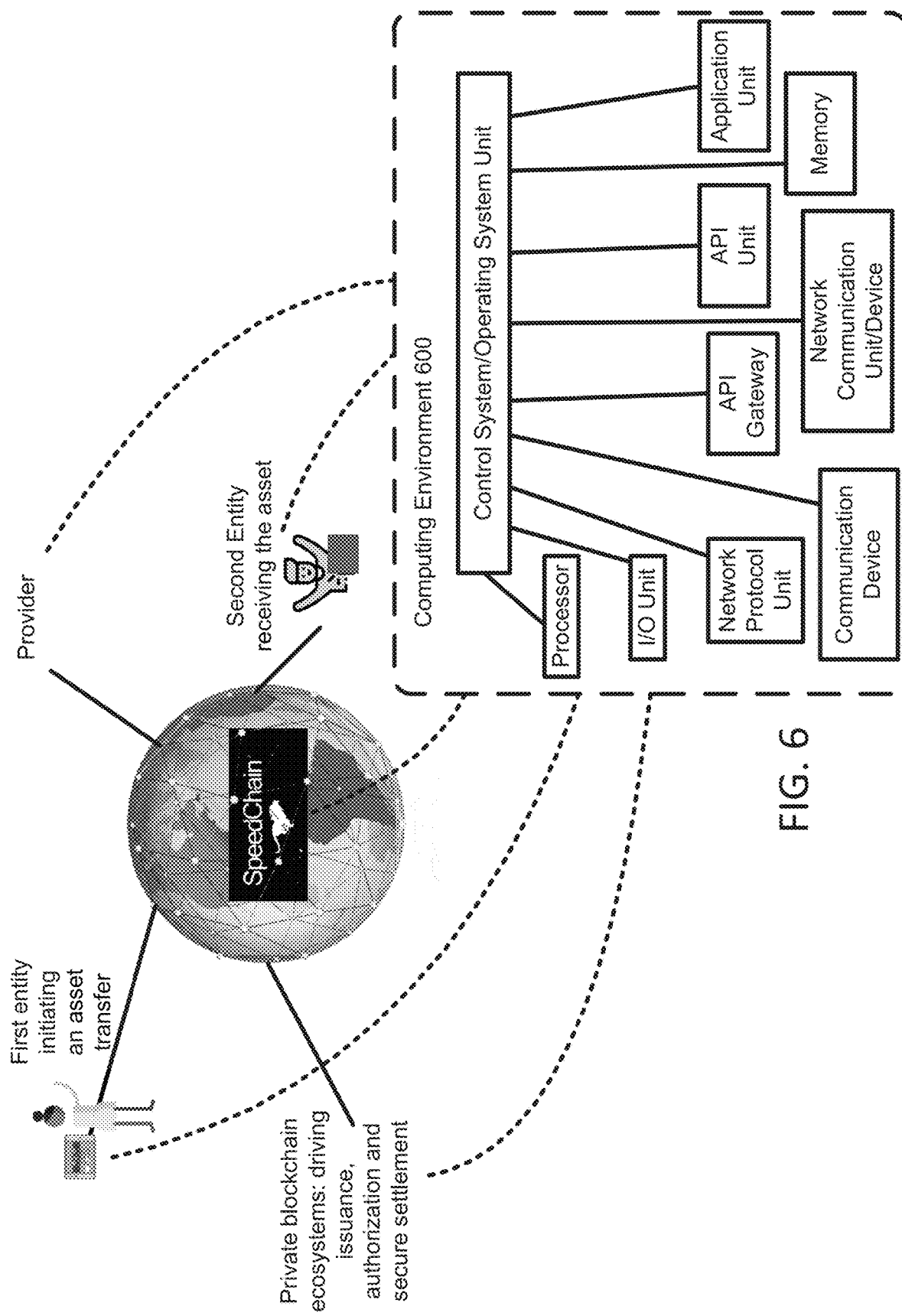
FIG. 6 is a network diagram associated with the platform driven by speedchain, according to some embodiments of this disclosure, and a computing environment that can be implemented anywhere within the network diagram of FIG. 6 or in the computing environment of any other figure described herein, according to some embodiments of this disclosure.

It is appreciated that the processes executed in association with the platform can be executed by a computing environment such as computing environment 600 shown in FIG. 6. More specifically, computing environment 600 can be used by the first entity to initiate a transaction (e.g., asset transfer) and can also be used by the second entity to initiate a transaction (e.g., asset reception). Computing environment 600 can also be used by the provider associated with the platform to execute the operation of the platform. In essence, computing environment 600 can be used anywhere in the network diagram of FIG. 6. The computing environment 600 may be integrated into one or more computing devices or apparatuses associated with FIG. 6 or any other computing devices or apparatuses or networks illustrated or described herein.

Embodiments of this disclosure may provide a non-transitory computer-readable medium comprising computer-readable code configured for performing one or more operations or functions described herein. In some embodiments, the apparatus may include a resource allocating system (e.g., in the processor or separate from the processor) for allocating memory and/or power resources among the various components of the apparatus.

The processor may control any of the other units in the apparatus, elements of those units, and/or functions performed by those units. Any actions described herein as being performed by a processor may be taken by the processor alone and/or by the processor in conjunction with one or more additional processors, units, subunits, elements, components, devices, and/or the like. Additionally, while only one processor may be shown in the figures, multiple processors may be present and/or otherwise included in the computing environment 600 (see FIG. 6). Thus, while instructions may be described as being executed by the processor (and/or various units of the processor), the instructions may be executed simultaneously, serially, and/or by one or multiple processors in parallel.

In some embodiments, the processor may be implemented as one or more computer processor (CPU) chips and/or graphical processor (GPU) chips and may include a hardware device capable of executing computer instructions. The processor may execute instructions, codes, computer programs, and/or scripts. The instructions, codes, computer programs, and/or scripts may be received from and/or stored in the memory, the I/O unit, the network communication device, sub-units and/or elements of the aforementioned units, other devices and/or computing environments, and/or the like. As described herein, any unit and/or subunit (e.g., element) of the computing environment and/or any other computing environment may be utilized to perform any operation. In some embodiments, the computing environment may not include a generic computing system, but instead may include a customized computing system designed to perform the various methods described herein.

The memory may include random access memory (RAM), read only memory (ROM), and/or various forms of secondary storage. RAM may be used to store volatile data and/or to store instructions that may be executed by the processor. For example, the data stored may be a command, a current operating state or configuration of the apparatus, and/or the like. As a further example, data stored in the memory may include instructions related to various methods and/or functionalities described herein. ROM may be a non-volatile memory device that may have a smaller memory capacity than the memory capacity of a secondary storage. ROM may be used to store instructions and/or signals that may be read during execution of computer instructions. In some embodiments, access to both RAM and ROM may be faster than access to secondary storage. Secondary storage may be comprised of one or more disk drives and/or tape drives and may be used for non-volatile storage of data or as an over-flow data storage device if RAM is not large enough to hold all working data. Secondary storage may be used to store programs that may be loaded into RAM when such programs are selected for execution. In some embodiments, the memory may include one or more databases for storing any data described herein. Additionally or alternatively, one or more secondary databases located remotely from the computing environment may be utilized and/or accessed by the memory.

In some embodiments, the memory may be utilized for storing, recalling, receiving, transmitting, and/or accessing various instructions or data during operation of the apparatus. The memory may include various types of data storage media such as solid state storage media, hard disk storage media, and/or the like. The memory may include dedicated hardware elements such as hard drives and/or servers, as well as software elements such as cloud-based storage drives. In some embodiments, the memory may include various units such as an operating system unit (which may also be referred to as a control system unit), an application unit, and/or an application programming interface (API) unit.

The operating system unit may facilitate deployment, storage, access, execution, and/or utilization of an operating system utilized by the computing environment and/or any other computing environment described herein. In some embodiments, the operating system may include various hardware and/or software elements that serve as a structural framework for enabling the processor to execute various operations described herein. The operating system unit may further store various pieces of information and/or data associated with operation of the operating system and/or the computing environment as a whole, such as a status of computing resources (e.g., processing power, memory availability, resource utilization, and/or the like), runtime information, modules to direct execution of operations described herein, user permissions, security credentials, and/or the like. The computing environment may include, but is not limited to, computing grid systems, distributed computing environments, cloud computing environment, etc. Such networked computing environments include hardware and software infrastructures configured to form a virtual organization comprised of multiple resources which may be in geographically disperse locations.

The application unit may facilitate deployment, storage, access, execution, and/or utilization of an application utilized by the computing environment (e.g., associated with the apparatus). For example, users may be required to download, access, and/or otherwise utilize a software application on the apparatus or a computing device in communication with the apparatus in order for various operations described herein to be performed. Information included in the application unit may enable a user to execute various operations described herein. The application unit may further store various pieces of information associated with operation of the application and/or the computing environment as a whole, such as a status of computing resources (e.g., processing power, memory availability, resource utilization, and/or the like), runtime information, modules to direct execution of operations described herein, user permissions, security credentials, and/or the like.

The API unit may facilitate deployment, storage, access, execution, and/or utilization of information associated with APIs of the computing environment. For example, computing environment may include one or more APIs for enabling various input systems, computing devices, applications, and/or computing environments to communicate with each other and/or perform operations on data. Accordingly, the API unit may include API databases comprising information that may be accessed and/or utilized by applications and/or operating systems of other devices and/or computing environments. In some embodiments, each API database may be associated with a customized physical circuit included in the memory and/or the API unit.

The I/O unit may facilitate the receipt, transmission, processing, presentation, display, input, and/or output of data as a result of executed processes described herein. In some embodiments, the I/O unit may include a plurality of I/O units. In some embodiments, the I/O unit may include one or more elements of a computing device, a server, and/or a similar device. The I/O unit may include a variety of elements that enable a user to interface with the computing environment. For example, the I/O device may include a keyboard, a touchscreen, a touchscreen sensor array, a mouse, a stylus, a button, a sensor, a depth sensor, a tactile input element, a location sensor, a biometric scanner, a laser, a microphone, a camera, and/or another element for receiving and/or collecting input from a user and/or information associated with the user and/or the user's environment. Additionally and/or alternatively, the I/O unit may include a display, a screen, a projector, a sensor, a vibration mechanism, a light emitting diode (LED), a speaker, a radio frequency identification (RFID) scanner, and/or another element for presenting and/or otherwise outputting data to a user. In some embodiments, the I/O unit may communicate with one or more elements of the processor and/or the memory to execute operations described herein.

The network communication device may facilitate establishment, maintenance, monitoring, and/or termination of communications between the computing environment (e.g., associated with the apparatus) and other devices such as other apparatuses, computing devices, other computing environments, server systems, and/or the like. The network communication device may further enable communication between various elements of the computing environment. In some embodiments, the network communication device may include a network protocol unit, an API gateway, and/or a communication device. The network communication device may include hardware and/or software elements.

The network protocol unit may facilitate establishment, maintenance, and/or termination of a communication connection between the computing environment (e.g., associated with the apparatus) and another device (e.g., associated with another apparatus or another computing device) by way of a network. For example, the network protocol unit may detect and/or define a communication protocol required by a particular network and/or network type. Communication protocols utilized by the network protocol unit may include Wi-Fi protocols, Li-Fi protocols, cellular data network protocols, Bluetooth® protocols, WiMAX protocols, Ethernet protocols, powerline communication (PLC) protocols, Voice over Internet Protocol (VoIP), and/or the like. In some embodiments, facilitation of communication between the computing environment and any other device, as well as any element internal to the computing environment, may include transforming and/or translating data from being compatible with a first communication protocol to being compatible with a second communication protocol. In some embodiments, the network protocol unit may determine and/or monitor an amount of data traffic to consequently determine which particular network protocol is to be used for transmitting and/or receiving data.

The API gateway may facilitate the enablement of the apparatus, or other devices and/or computing environments, to access the API unit of the memory unit of the computing environment (e.g., associated with the apparatus or other apparatuses or computing devices). For example, a computing device may access the API unit via the API gateway. In some embodiments, the API gateway may be required to validate user credentials associated with a user of a computing device prior to providing access to the API unit to the user. The API gateway may include instructions for enabling the computing environment to communicate with another device.

The communication device may include a variety of hardware and/or software specifically purposed to enable communication between the computing environment and another device, as well as communication between elements of the computing environment. In some embodiments, the communication device may include one or more radio transceivers, chips, analog front end (AFE) units, antennas, digital or analog processors, memory, other logic, and/or other components to implement communication protocols (wired or wireless) and related functionality for facilitating communication between the computing environment and any other device. Additionally and/or alternatively, the communication device may include a modem, a modem bank, an Ethernet device such as a router or switch, a universal serial bus (USB) interface device, a serial interface, a token ring device, a fiber distributed data interface (FDDI) device, a wireless local area network (WLAN) device and/or device component, a radio transceiver device such as code division multiple access (CDMA) device, a global system for mobile communications (GSM) radio transceiver device, a universal mobile telecommunications system (UMTS) radio transceiver device, a long term evolution (LTE) radio transceiver device, a worldwide interoperability for microwave access (WiMAX) device, and/or another device used for communication purposes.

It is contemplated that the computing elements be provided according to the structures disclosed herein may be included in integrated circuits of any type to which their use commends them, such as ROMs, RAM (random access memory), DRAM (dynamic RAM), and video RAM (VRAM), PROMs (programmable ROM), EPROM (erasable PROM), EEPROM (electrically erasable PROM), EAROM (electrically alterable ROM), caches, and other memories, and to microprocessors and microcomputers in all circuits including ALUs (arithmetic logic units), control decoders, stacks, registers, input/output (I/O) circuits, counters, general purpose microcomputers, RISC (reduced instruction set computing), CISC (complex instruction set computing) and VLIW (very long instruction word) processors, and to analog integrated circuits such as digital to analog converters (DACs) and analog to digital converters (ADCs). ASICS, PLAs, PALs, gate arrays and specialized processors such as digital signal processors (DSP), graphics system processors (GSP), synchronous vector processors (SVP), and image system processors (ISP) all represent sites of application of the principles and structures disclosed herein.

This application claims the benefit of U.S. Provisional Patent Application No. 62/786,202, titled "Asset-backed network token for use in a hybrid distributed ledger-based network ecosystem," filed Dec. 28, 2018, which is incorporated by reference herein in its entirety for all purposes.

Implementation of any device or unit or element of any apparatus or device described herein is contemplated in discrete components or fully integrated circuits in silicon, gallium arsenide, or other electronic materials families, as well as in other technology-based forms and embodiments. It should be understood that various embodiments of the invention can employ or be embodied in hardware, software, microcoded firmware, or any combination thereof. When an embodiment is embodied, at least in part, in software, the software may be stored in a non-volatile, machine-readable medium.

While various embodiments in accordance with the disclosed principles have been described above, it should be understood that they have been presented by way of example only, and are not limiting. Thus, the breadth and scope of the invention(s) should not be limited by any of the above-described exemplary embodiments, but should be defined only in accordance with the claims and their equivalents issuing from this disclosure. Furthermore, the above advantages and features are provided in described embodiments, but shall not limit the application of such issued claims to processes and structures accomplishing any or all of the above advantages. Any features or embodiments described herein may be combined or integrated with any other features or embodiments described herein.

Additionally, the section headings herein are provided for consistency with the suggestions under 37 C.F.R. 1.77 or otherwise to provide organizational cues. These headings shall not limit or characterize the invention(s) set out in any claims that may issue from this disclosure. Specifically and by way of example, although the headings refer to a "Technical Field," such claims should not be limited by the language chosen under this heading to describe the so-called technical field. Further, a description of a technology in the "Background" is not to be construed as an admission that technology is prior art to any invention(s) in this disclosure. Neither is the "Summary" to be considered as a characterization of the invention(s) set forth in issued claims. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of such claims shall be considered on their own merits in light of this disclosure, but should not be constrained by the headings herein.

What is claimed is:

1. A method for use in a blockchain network, the method comprising:

providing a resource-allocating system for allocating computing resources to a blockchain network comprising an enterprise network and a reconciliation network;

generating, using one or more computing device processors, identification information association with a user, wherein the user establishes a private key associated with a distributed ledger, wherein the identification information associated with the user is different from the private key associated with the distributed ledger;

determining, using the one or more computing device processors, the identification information associated with the user initiating a computing operation in the enterprise network comprised in the blockchain network, wherein first data and second data associated with the computing operation are stored in the distributed ledger; and accessing, using the one or more computing device processors, a reconciliation digital facilitator, wherein the reconciliation digital facilitator provides first parametric information for capturing, from the enterprise network, the first data, associated with the computing operation, stored in the distributed ledger, or the second data, associated with the computing operation, stored in the distributed ledger, and transmitting, in or to the reconciliation network, the first data, associated with the computing operation, stored in the distributed ledger, or the second data, associated with the computing operation, stored in the distributed ledger, wherein the first data or the second data, associated with the computing operation, stored in the distributed ledger, comprises or is associated with the identification information associated with the user;

tracking, using the identification information associated with the user different from the private key associated with the distributed ledger, the first data associated with the computing operation or the second data associated with the computing operation; and providing, using the one or more computing device processors, a dashboard for enabling access to the first data or the second data associated with the computing operation.

2. The method of claim 1, wherein the identification information associated with the user enables the user to initiate computing operations in the enterprise network.

3. The method of claim 1, wherein the first data, the second data, or the identification information associated with the user is at least one of recoverable, traceable, storable, or transmittable.

4. The method of claim 1, wherein the identification information associated with the user comprises geographic or network location information.

5. The method of claim 1, wherein the identification information associated with the user provides authorization for the initiation of the computing operation.

6. The method of claim 5, wherein the computing operation comprises at least one data sharing operation associated with sharing the first data from the enterprise network to the reconciliation network.

7. The method of claim 6, wherein a recipient of the first data in the reconciliation network cannot initiate a second computing operation in the enterprise network.

8. The method of claim 1, wherein the user is associated with a digital wallet.

9. The method of claim 1, wherein the first data comprises a token, and wherein the token is associated with a physical or digital asset.

10. The method of claim 1, wherein the first data or the second data comprises remittance data.

11. The method of claim 1, wherein the remittance data is associated with or comprises currency data.

12. The method of claim 1, wherein second parametric information associated with an issuance digital facilitator, associated with the enterprise network in the blockchain network, is used for generating the identification information associated with the user.

13. The method of claim 1, wherein the reconciliation digital facilitator comprises or is a smart contract.

14. The method of claim 1, wherein the enterprise network and the reconciliation network share at least one common user or node.

15. The method of claim 1, further comprising providing, using the one or more computing device processes, an omni-channel for distributing the first data or the second data to at least two distinct users connected to the blockchain network.

16. A system for use in a blockchain network, the system comprising one or more computing device processors configured to:

allocate computing resources to a blockchain network comprising an enterprise network and a reconciliation network;

generate identification information associated with a user, wherein the user establishes a private key associated with a distributed ledger, wherein the identification information associated with the user is different from the private key associated with the distributed ledger;

determine the identification information associated with the user initiating a computing operation in the enterprise network comprised in the blockchain network, wherein first data and second data associated with the computing operation are stored in the distributed ledger; and access a reconciliation digital facilitator, wherein the reconciliation digital facilitator provides parametric information for capturing, from the enterprise network, the first data, associated with the computing operation, stored in the distributed ledger, or the second data, associated with the computing operation, stored in the distributed ledger, and transmitting, in or to the reconciliation network, the first data, associated with the computing operation, stored in the distributed ledger, or the second data, associated with the computing operation, stored in the distributed ledger, wherein the first data or the second data, associated with the computing operation, stored in the distributed ledger, comprises or is associated with the identification information associated with the user;

track, using the identification information associated with the user different from the private key associated with the distributed ledger, the first data associated with the computing operation or the second data associated with the computing operation; and provide a dashboard for enabling access to the first data or the second data associated with the computing operation.

17. A method for use in a blockchain network, the method comprising:

providing a resource-allocating system for allocating computing resources to a blockchain network comprising an enterprise network and a reconciliation network;

generating, using one or more computing device processors, identification information associated with a user, wherein the user establishes a private key associated with a distributed ledger, wherein the identification information associated with the user is different from the private key associated with the distributed ledger;

determining, using the one or more computing device processors, the identification information associated with the user initiating a computing operation in the enterprise network comprised in the blockchain network, wherein first data and second data associated with the computing operation are stored in the distributed ledger;

accessing, using the one or more computing device processors, a reconciliation digital facilitator, wherein the reconciliation digital facilitator provides parametric information for capturing, from the enterprise network, the first data, associated with the computing operation, stored in the distributed ledger, or the second data, associated with the computing operation, stored in the distributed ledger, and transmitting, in or to the reconciliation network, the first data, associated with the computing operation, stored in the distributed ledger, or the second data, associated with the computing operation, stored in the distributed ledger, wherein the first data or the second data, associated with the computing operation, stored in the distributed ledger, comprises or is associated with the identification information associated with the user; and tracking, using the identification information associated with the user different from the private key associated with the distributed ledger, the first data associated with the computing operation or the second data associated with the computing operation.

18. The method of claim 17, wherein the enterprise network and the reconciliation network share at least one common user or node.

* * * * *